(12) United States Patent
Asano

(10) Patent No.: US 8,750,607 B2
(45) Date of Patent: Jun. 10, 2014

(54) IMAGE PROCESSING APPARATUS CAPABLE OF EFFICIENTLY COMPRESSING AN ORIGINAL IMAGE

(75) Inventor: Motohiro Asano, Osaka (JP)

(73) Assignee: Konica Minolta Business Technologies, Inc. (JP)

(*) Notice: Subject to any disclaimer, the term of this patent is extended or adjusted under 35 U.S.C. 154(b) by 889 days.

(21) Appl. No.: 12/482,559

(22) Filed: Jun. 11, 2009

(65) Prior Publication Data

US 2009/0310873 A1    Dec. 17, 2009

(30) Foreign Application Priority Data

Jun. 13, 2008   (JP) ................................. 2008-155523

(51) Int. Cl.
G06K 9/00 (2006.01)
G06K 9/36 (2006.01)
G06K 9/46 (2006.01)

(52) U.S. Cl.
USPC ............................ 382/166; 382/239; 382/245

(58) Field of Classification Search
USPC .......... 382/162, 164, 166, 232, 239, 244, 245
See application file for complete search history.

(56) References Cited

U.S. PATENT DOCUMENTS

| | | | | |
|---|---|---|---|---|
| 4,580,134 A | * | 4/1986 | Campbell et al. | 345/589 |
| 5,046,119 A | * | 9/1991 | Hoffert et al. | 382/166 |
| 5,047,853 A | * | 9/1991 | Hoffert et al. | 375/240.01 |
| 5,164,819 A | * | 11/1992 | Music | 375/240.24 |
| 6,285,458 B1 | * | 9/2001 | Yada | 358/1.15 |
| 6,542,631 B1 | * | 4/2003 | Ishikawa | 382/162 |
| 6,707,939 B1 | * | 3/2004 | Weinholz et al. | 382/164 |

FOREIGN PATENT DOCUMENTS

| JP | 9-322162 A | 12/1997 |
|---|---|---|
| JP | 2007-43577 A | 2/2007 |

* cited by examiner

*Primary Examiner* — Bernard Krasnic
(74) *Attorney, Agent, or Firm* — Cantor Colburn LLP

(57) ABSTRACT

An image processing apparatus successively counts numbers of continuous blocks starting from a left end in view of a number of color(s) forming each block and the color of a preceding block. In this counting, when a first block formed of two colors is input, then second block formed of one of the two colors of the first block is input and then blocks formed of the same one color as the second block are continuously input (second to fourth), the image processing apparatus handles the second to fourth blocks as one-color blocks continuing after the two-color block, and encodes the first to fourth blocks into a code indicating identification information to the effect, a continuation number of the two-color block, color information of each color, information specifying the color of the one-color block being one of the two colors, and the continuation number of the one-color blocks.

7 Claims, 23 Drawing Sheets

|  | R | G | B |
|---|---|---|---|
| REGION 0 | 252 | 224 | 234 |

FIG.11
|  | R | G | B |
|---|---|---|---|
| REGION 0 | 15 | 38 | 240 |
| REGION 1 | 252 | 224 | 234 |
FIG.12A
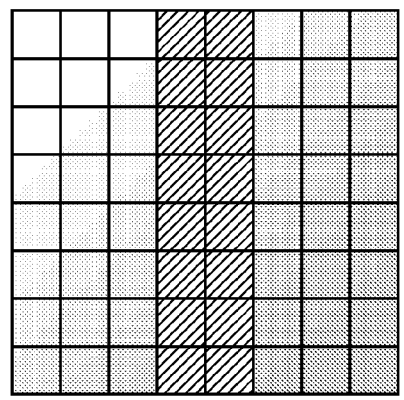
FIG.12B
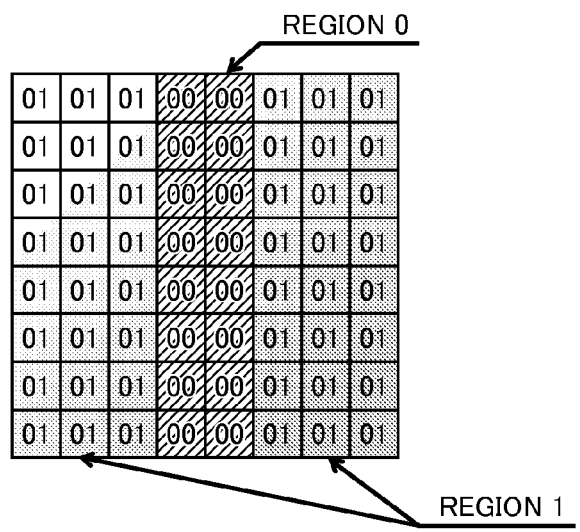

FIG.14

|  | R | G | B |
|---|---|---|---|
| REGION 0 | 15 | 38 | 240 |
| REGION 1 | 252 | 224 | 234 |
| REGION 2 | 247 | 140 | 191 |
| REGION 3 | 232 | 71 | 127 |

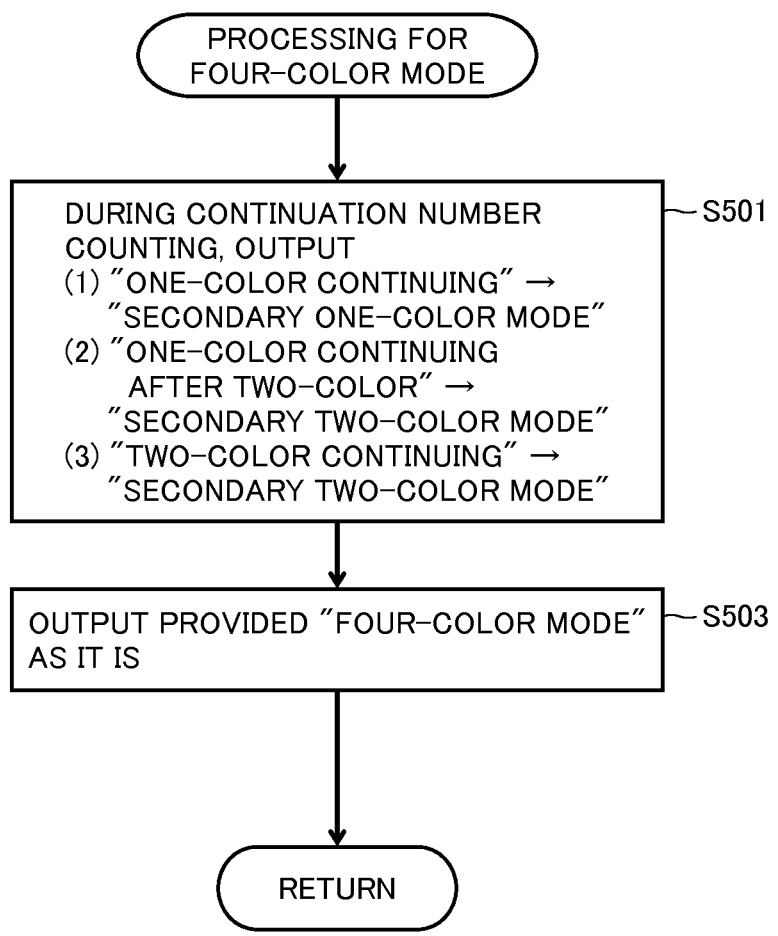

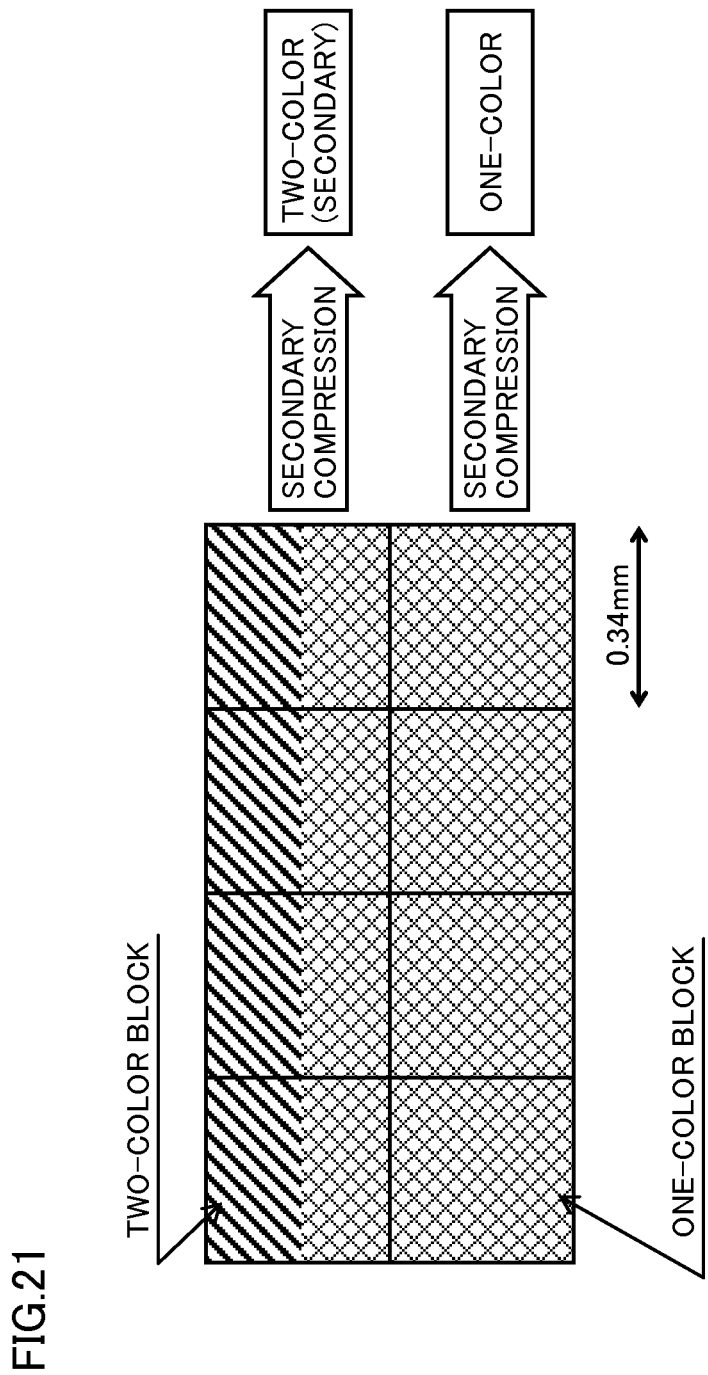

IMAGE PROCESSING APPARATUS CAPABLE OF EFFICIENTLY COMPRESSING AN ORIGINAL IMAGE

This application is based on Japanese Patent Application No. 2008-155523 filed with the Japan Patent Office on Jun. 13, 2008, the entire content of which is hereby incorporated by reference.

BACKGROUND OF THE INVENTION

1. Field of the Invention

The present invention relates to an image processing method, an image processing apparatus and a medium recording an image processing program, and particularly to an image processing method, an image processing apparatus and a medium recording an image processing program for performing encoding processing on image data.

2. Description of the Related Art

There has been a compression method called BTC (Block Truncation Coding) as a technique of encoding and thereby compressing image data. According to the BTC compression, an original image data is divided into a plurality of regions, and encoding is performed by expressing all picture elements in each region by a predetermined number or less of representative colors. According to the BTC compression, each picture element is replaced with a color value so that original image data is compressed to reduce its information quantity. However, the compressed data includes information corresponding to the number of picture elements of the original image. Therefore, the compression efficiency is not necessarily high.

Accordingly, there have been proposed various techniques for compressing image data more efficiently in the method of encoding the picture elements by replacing them with information of fewer colors. For example, Japanese Laid-Open Patent Publication No. 09-322162 (document 1) has disclosed a technique of performing compression in a special mode, and particularly compression that is executed in view of continuity of picture elements when all the picture elements in a block have the same color value. Further, Japanese Laid-Open Patent Publication No. 2007-043577 has disclosed a technique in which compressed image data is divided into data items of predetermined sizes and secondary compression is performed on them.

However, even when the above method employs the technique disclosed in the document 1, such a problem occurs that the continuity does not effectively act on compressibility when a large change in color such as a gradation is present in the original image. Particularly, when the original image has a gradation in a direction (e.g., lateral direction) matching a compression direction, the above problem becomes remarkable.

SUMMARY OF THE INVENTION

The invention has been made in view of the above problem, and an object of the invention is to provide an image processing method that compresses an original image and particularly can efficiently compress it even when gradation is present in a direction matching a compression direction, as well as an image processing apparatus and a medium recording an image processing program.

For achieving the above object, according to an aspect of the invention, an image processing method for encoding image data, includes the steps of dividing the image data into blocks of a predetermined size; and encoding both of a first block and a second block included among the plurality of divided blocks into one code, the first block having two or more colors, and the second block being arranged adjacent to the first block in an encoding direction and having one of the two or more colors of the first block.

According to another aspect, an image processing apparatus includes an input device for accepting input of image data; and a controller for controlling and causing the image processing apparatus to perform, on the image data, (i) processing of dividing the image data into blocks of a predetermined size; and (ii) encoding both of a first block and a second block included among the plurality of divided blocks into one code, the first block having two or more colors, and the second block being arranged adjacent to the first block in an encoding direction and having one of the two or more colors of the first block.

According to still another aspect of the invention, a computer-readable medium records a program for causing a computer to execute the steps of dividing the image data into blocks of a predetermined size; and encoding both of a first block and a second block included among the plurality of divided blocks into one code, the first block having two or more colors, and the second block being arranged adjacent to the first block in an encoding direction and having one of the two or more colors of the first block.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9A illustrates a manner of compressing the original image data.

FIG. 9B shows a specific example of representative values.

FIG. 11 shows a specific example of the representative values.

FIGS. 12A, 12B, 13A and 13B illustrate a manner of compressing the original image data.

FIG. 14 shows a specific example of the representative values.

FIG. 19 is a flowchart showing a specific example of processing for a four-color mode.

FIG. 21 illustrates secondary compression processing of an original image having a longitudinal gradation.

DESCRIPTION OF THE PREFERRED EMBODIMENTS

Embodiments of the invention will now be described with reference to the drawings. In the following description, the same parts and components bear the same reference numbers and the same names, and achieve the same functions.

An image processing apparatus according to an embodiment is implemented by a personal computer, which may also be referred to as a "PC" hereinafter.

Figure 1:
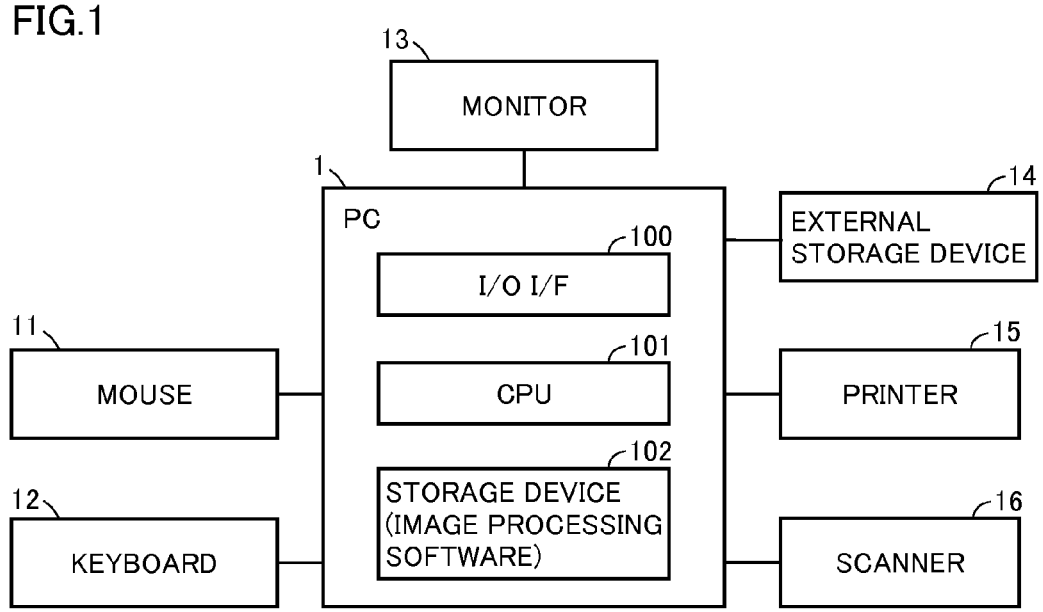
FIG. 1 shows a specific example of structural concepts of a PC (Personal Computer) and its peripheral devices according to an embodiment.

Referring to FIG. 1, a PC 1 according to the embodiment functions as an image processing apparatus, and is connected to a mouse 11 and a keyboard 12 that are devices for entering operations, a monitor 13 that is a display device, a printer 15 that is an image forming apparatus, a scanner 16 and an external storage device 14. PC 1 internally includes an input/output interface (I/F) 100 for transmitting information to or from these peripheral devices connected thereto. Further, PC 1 internally includes a CPU (Central Processing Unit) 101 and a storage device 102, which stores image processing software. PC 1 can function as the image processing apparatus by reading and executing the image processing software.

Figure 2:
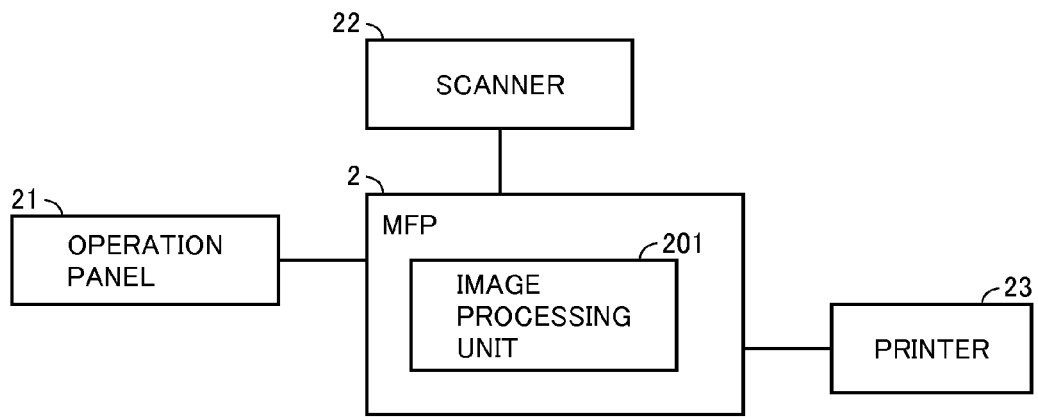
FIG. 2 shows a specific structure of a specific example of an MFP (Multi-Function Peripheral) functioning as an image processing apparatus.

The device implementing the image processing apparatus is not restricted to the PC, and may be another apparatus. An MFP (Multi-Function Peripheral) shown in FIG. 2 is a typical example of such an apparatus. Referring to FIG. 2, MFP 2 includes an operation panel 21 that is a device for entering operations, a scanner 22 and a printer 23. Further, MFP 2 internally includes an image processing unit 201. When image processing unit 201 executes processing, MFP 2 can function as the image processing apparatus.

Figure 3:
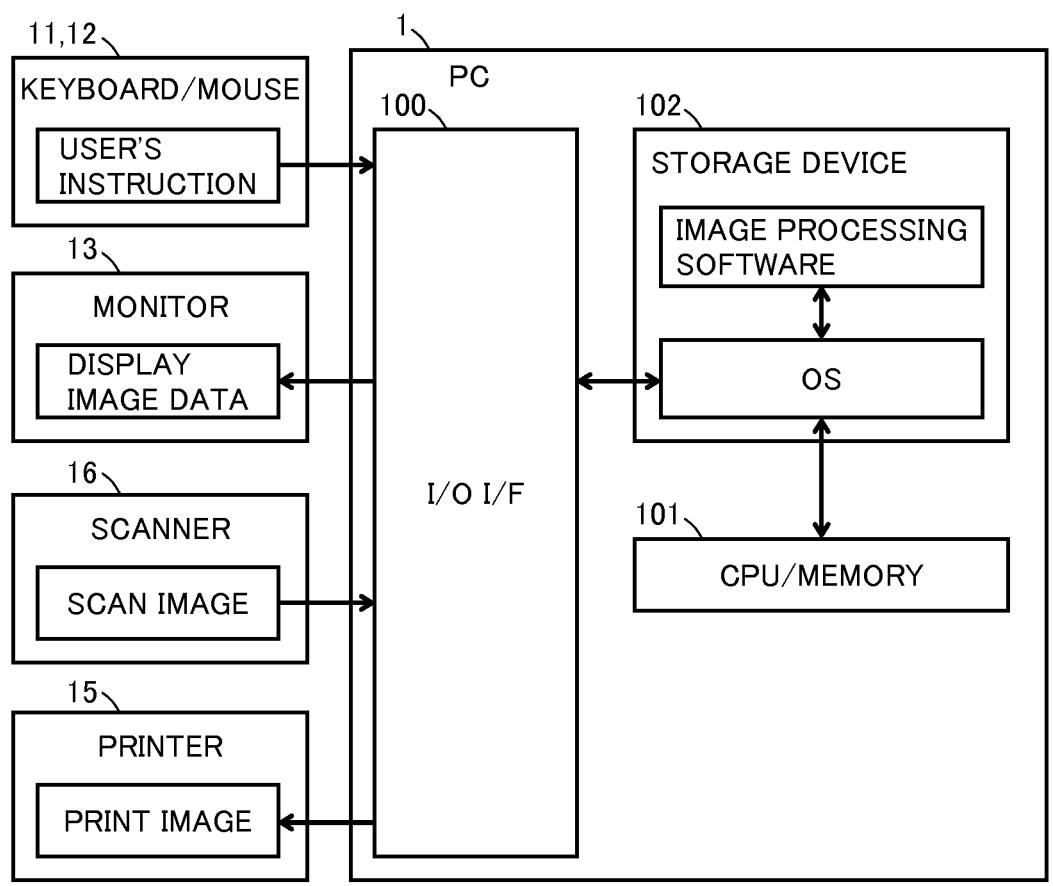
FIG. 3 is a block diagram showing specific examples of a hardware structure of a PC and its function according to the embodiment.

Referring to FIG. 3, input/output I/F 100 is connected to mouse 11 and keyboard 12, and receives user's instructions entered through mouse 11 and/or keyboard 12. Input/output I/F 100 is connected to monitor 13, and transfers image data for display to monitor 13. Input/output I/F 100 is also connected to scanner 16, and accepts image data (scan data) obtained by scanning by scanner 16. Input/output I/F 100 is further connected to printer 15 and transfers the image data for printing to printer 15.

Storage device 102 stores the foregoing image processing software and operation software. External storage device 14 may store at least a part of such software. CPU 101 internally includes a memory, in which the software read from storage device 102 is developed for execution. For this execution, the data entered via input/output I/F 100 is used, and the data produced by the processing is provided to another device via input/output I/F 100.

When CPU 101 executes the image processing software stored in storage device 102, the image processing apparatus is implemented, and performs the processing of encoding for compressing the image data such as image data obtained by reading the original document by scanner 16 or image data prepared by executing, e.g., application software in PC 1 (e.g., text data prepared by execution with text preparing software). In the following description, the image data not yet compressed will be referred to as an "original image data" hereinafter.

The function of PC 1 for compressing the original image data is mainly implemented by CPU 101 that executes the image processing software stored in storage device 102. At least a part of the above function may be implemented, using a hardware structure shown in FIG. 2.

Figure 4:
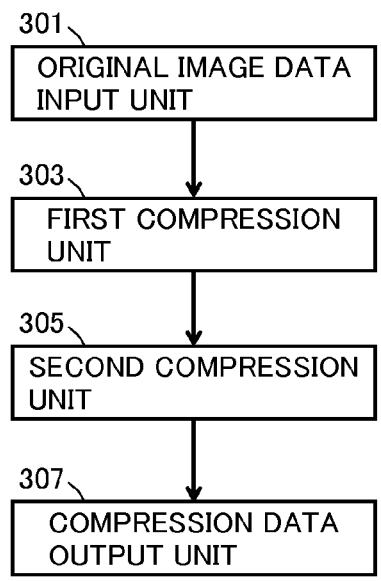
FIG. 4 is a block diagram showing a specific example of a functional structure of the PC according to the embodiment.

Referring to FIG. 4, the above function of the PC 1 includes an original image data input unit 301, first and second compression units 303 and 305, and a compression data output unit 307.

Original image data input unit 301 is connected to input/output I/F 100, and accepts, through input/output I/F 100, the original image data that is obtained by scanning the original image by scanner 16. Original image data input unit 301 includes a function for executing the application software and the like in PC 1, and produces the image data by executing such application software or the like. Original image data input unit 301 is further connected to a first compression unit 303, and provides the input original image data to first compression unit 303. First compression unit 303 executes primary compression processing on the input original image data. First compression unit 303 is connected to second compression unit 305 to provide the primarily compressed image data to second compression unit 305. Second compression unit 305 executes the secondary compression processing on the primarily compressed image data. Second compression unit 305 is further connected to compression data output unit 307, and provides the secondarily compressed image data to compression data output unit 307. Compression data output unit 307 is connected to input/output I/F 100, and provides the secondarily compressed image data to monitor 13.

Figure 5:
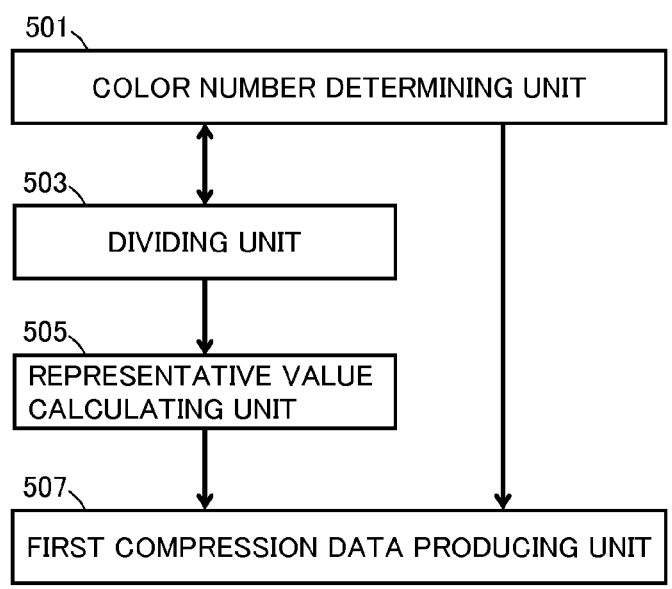
FIG. 5 is a block diagram showing a specific example of a specific structure of a first compression unit in the structure in FIG. 4.

Referring to FIG. 5, first compression unit 303 includes a color number determining unit 501, a dividing unit 503, a representative value calculating unit 505 and a first compression data producing unit 507.

Dividing unit 503 divides the input original image data into blocks each having a predetermined size of (8×8) picture elements, and applies up to four colors to the picture elements in the each block. In this processing, color number determining unit 501 determines whether the block has only one color or not, and provides a result of the determination to dividing unit 503 and first compression data producing unit 507. Dividing unit 503 repeats the division of the block into regions according to the result of determination by color number determining unit 501. Representative value calculating unit 505 calculates the representative value for each region in the block to be described later, and provides the calculated value to first compression data producing unit 507. First compression data producing unit 507 performs primary compression on the image data based on the result of determination by color number determining unit 501 and the result of calculation by representative value calculating unit 505, and thereby produces the primary compression data. The compressed image data additionally includes a result of the determination by color number determining unit 501, i.e., information indicating a color number mode to be described later.

Figure 6:
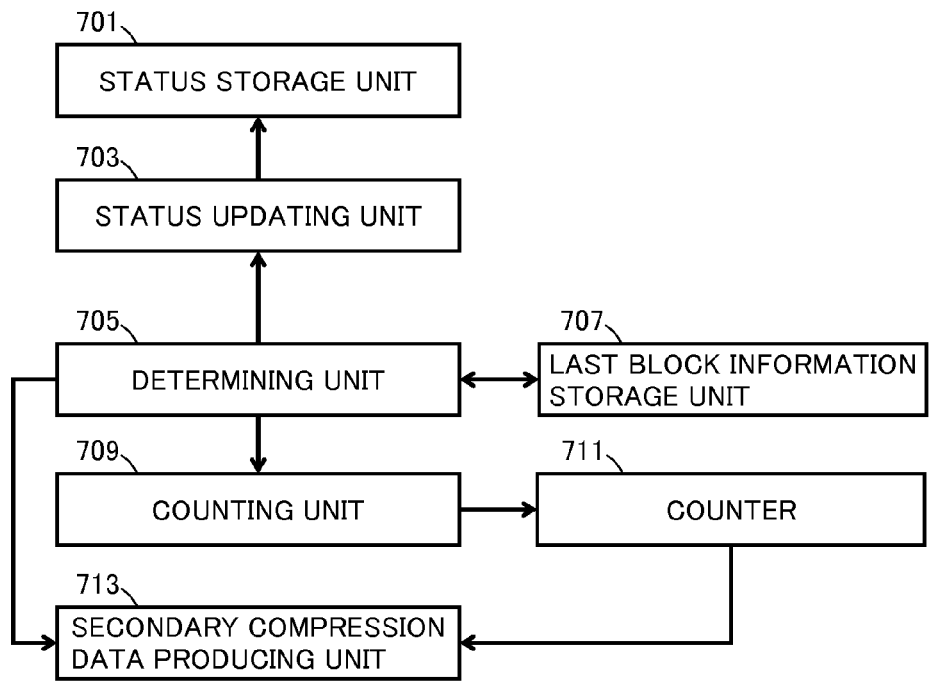
FIG. 6 is a block diagram showing a specific example of a specific structure of a second compression unit in the structure shown in FIG. 4.

Referring further to FIG. 6, second compression unit 305 includes a status storage unit 701, a status updating unit 703, a determining unit 705, a last block information storage unit 707, a counting unit 709, a counter 711 and a secondary compression data producing unit 713.

Status storage unit 701 stores a latest processing status to be described later. Last block information storage unit 707 stores the color number mode and the representative value of the last block (i.e., the block that was processed last) neighboring to the block that is being processed. Counter 711 includes counters for respective processing statuses.

Every time the primary compression data is input (a block in the line direction at a time), determining unit 705 makes a comparison in color number mode between the current and last block as well as in representative value between the current and last blocks, and provides a result of the compression to status updating unit 703, counting unit 709 and/or secondary compression data producing unit 713. Based on the result of comparison, status updating unit 703 updates the processing status stored in status storage unit 701 to the latest processing status. Counting unit 709 increments the corresponding count in counter 711 based on the above result of comparison.

Secondary compression data producing unit 713 performs the secondary compression on the primary compression data to produce secondary compression data based on the above result of comparison and counter 711.

Figure 7:
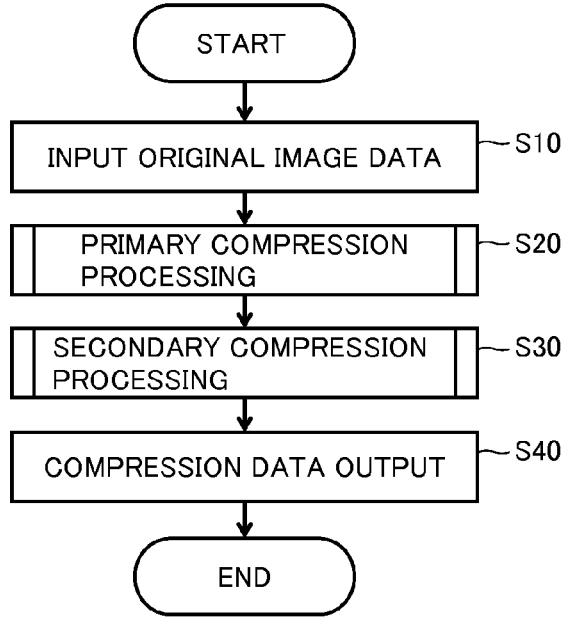
FIG. 7 is a flowchart showing a specific example of processing of compressing an original image data in the PC according to the embodiment.

Referring to FIG. 7, description will now be given on the processing of compressing the original image data in PC 1. The processing represented in the flowchart of FIG. 7 is implemented when CPU 101 executes the image processing software stored in storage device 102.

Referring to FIG. 7, in a step (which will be simply referred to as "S" hereinafter) 10, embedded data input unit 305 accepts the input of embedded data provided via input/output UF 100 from mouse 11 and/or keyboard 12. The original image data entered in S10 is primarily compressed by first compression unit 303 in S20, then is secondarily compressed by second compression unit 305 in S30, and then is output from compression data output unit 307 in S40.

Figure 8:
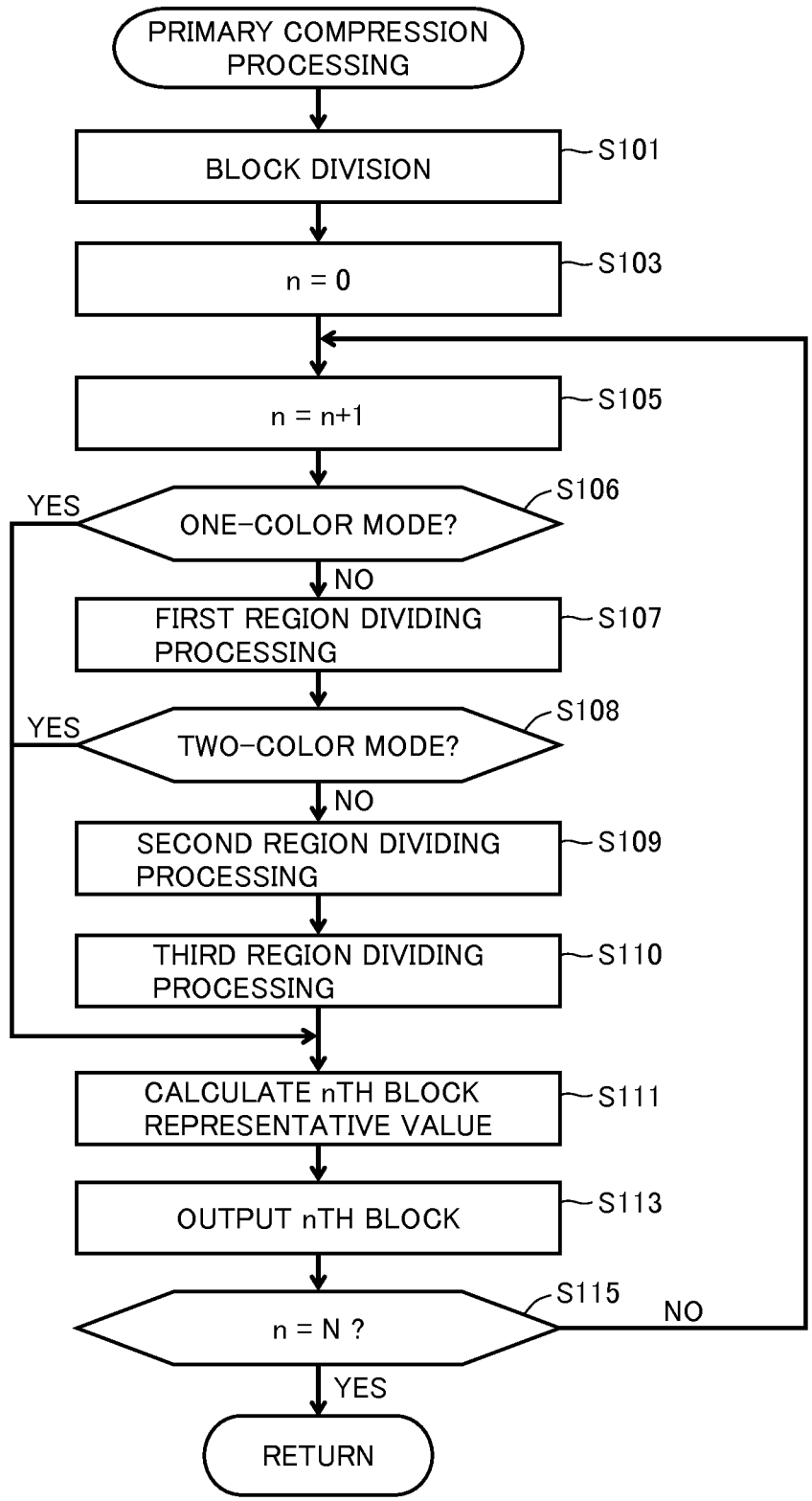
FIG. 8 is a flowchart showing a specific example of the primary compression processing.

Referring to FIG. 8, the primary compression processing in above S20 will now be described. Referring to FIG. 8, dividing unit 503 in S101 divides the original image data into blocks each having a predetermined size. After a variable n is initialized in S103, it is incremented by one in S105. In S106 and S108, color number determining unit 501 determines whether only one color is present in the block corresponding to variable n or not, and whether only two colors are present therein or not, before the region division in S107, S109 and S110. When it is determined that only one color is present (YES in S106), subsequent region dividing processing (S107, S109 and S110) is skipped. When it is determined that more than one color is present (NO in S106), dividing unit 503 executes the first region dividing processing on this block in S107. When it is determined that only two colors are present in the block corresponding to variable n (YES in S108), the first region dividing processing is performed in S107, and the subsequent region dividing processing (S109 and S110) is skipped. When it is determined that more than two colors are present (NO in S108), dividing unit 503 further executes second and third region dividing processing on the block in question in S109 and S110. Specific examples of the first, second and third region dividing processing will be described later.

Then, representative value calculating unit 505 calculates the foregoing representative values for the respective regions in the block. In S113, first compression data producing unit 507 produces the primary compression data by substituting the respective picture elements in the block with the calculated representative values, and outputs the produced data. First compression unit 303 executes the above processing on the blocks until number N of the blocks divided in S101 is attained (YES in S115).

The aforementioned primary compression method will be described below in connection with a specific example of the original image data.

Figures 9A, 9B:
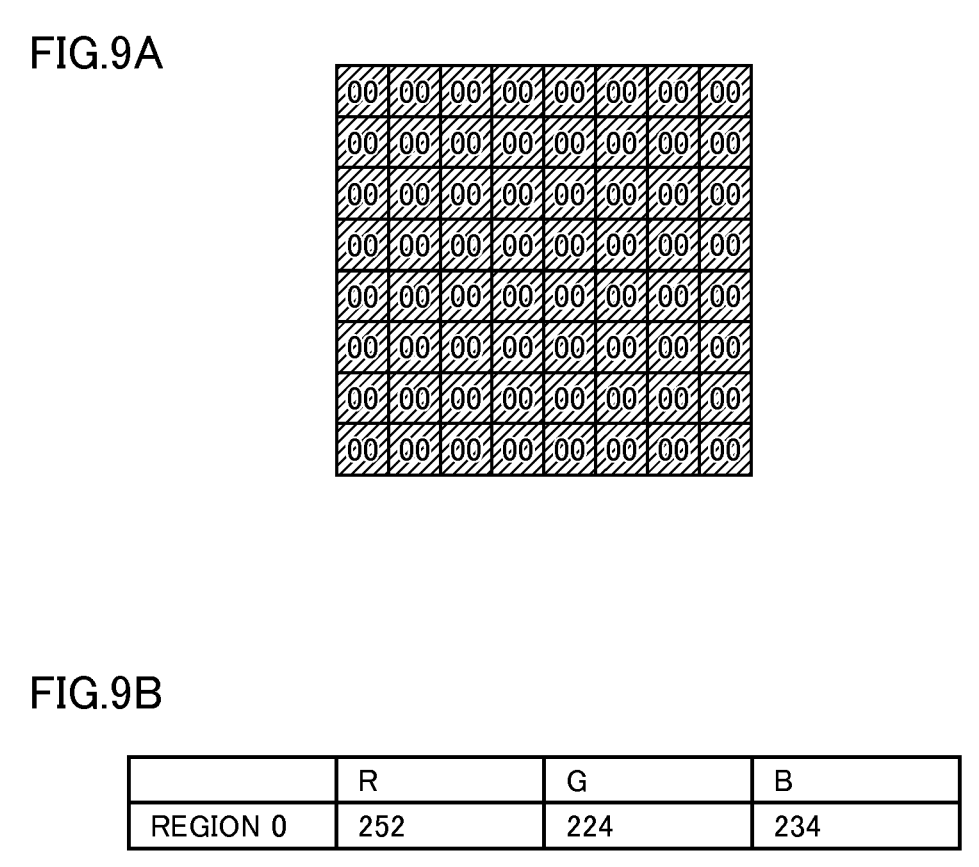

FIG. 9A shows one of the blocks (processing targets) that are prepared by dividing the original image data entered in S10 and each have a predetermined size ((8×8) picture elements in this example). It is assumed that this block is rendered in only one color (specifically, a first color such as red). In S106, color number determining unit 501 determines that the block has only one color, and decides the color number mode of this block as a one-color mode. The determination about a difference in color, namely, about the same color may be performed by determining whether the pixel values completely match together or not. Also, in each channel of the RGB, when a difference is equal to a predetermined value (e.g., 2) or less, it may be determined that the elements have the same color. The same is true with respect to the manner of the determination about the same color in subsequent processing. When the block to be processed is in the one-color mode, the region dividing processing is not performed at all, and the whole block is handled as one region. In S111, representative value calculating unit 505 calculates the representative value of a region 0 that is the whole block. When the first color is red, the representative value, i.e., the color value of red is specifically indicated in RGB value as expressed below and as shown in FIG. 9B:

region 0: (R, G, B) (252, 224, 234)

Figure 10A:
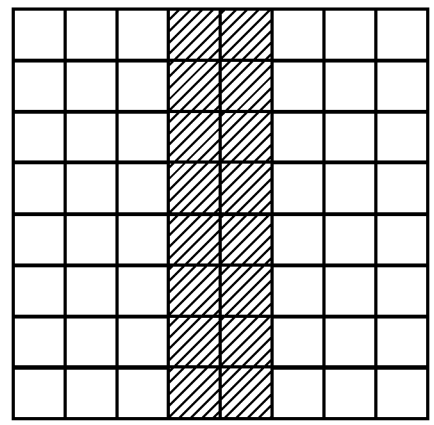
FIGS. 10A and 10B illustrate a manner of compressing the original image data.

It is assumed that a certain block to be processed has two colors as shown in FIG. 10A. More specifically, the block in question is substantially entirely rendered in the first color (e.g., red), and substantially has a longitudinally extending central portion that is rendered in a second color (e.g., blue). In this case, color number determining unit 501 determines in S106 that the block has only two colors, and determines that the color number mode of this block is a two-color mode. Since the block to be processed is in the two-color mode, the first region dividing processing (S107) that is the region dividing processing performed one time, and the subsequent region dividing processing is not performed.

Figure 10B:
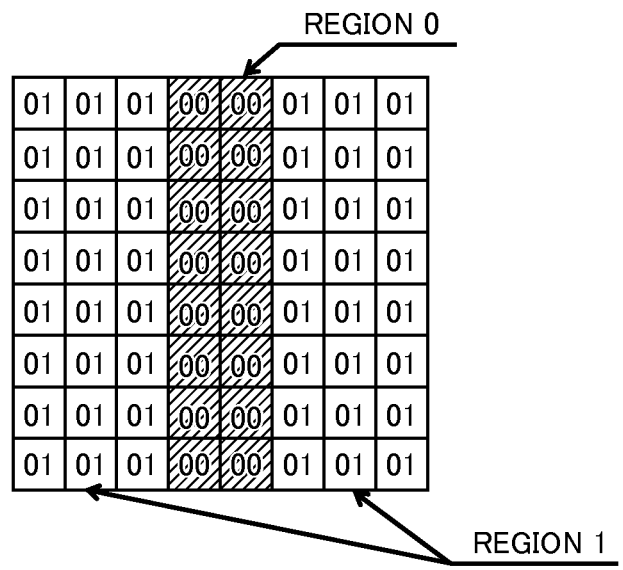

In a specific example of the first region dividing processing in S107, dividing unit 503 senses variations in color value in the block for each of the RGB colors that are represented by the image data corresponding to the picture elements in the block shown in FIG. 10A. The color of the largest variations in color value is specified among the RGB colors. For the specified color, calculation is performed to obtain an average value, in this block, of the color values represented by the image data corresponding to the respective picture elements. This block is divided into regions having color values larger than the calculated average value and the regions having the color values smaller than the calculated average value. FIG. 10B shows a state after the first region dividing processing is performed on the block in FIG. 10A. As a result of the first region dividing processing described above, the region having the second color is divided as a region 0, and the regions having the first color are divided as regions 1. In S111, representative value calculating unit 505 calculates the representative values of regions 0 and 1. When the first color is red, and the second color is blue, the representative value of each region is specifically indicated in RGB values as expressed below and as shown in FIG. 11:

region 0: (R, G, B)=(15, 38, 240)
region 1: (R, G, B)=(252, 224, 234)

It is assumed that a certain block to be processed has three or more colors as shown in FIG. 12A. Specifically, this block has a gradation in which the intensity of the first color (e.g., red) increases in a diagonal direction of a rectangular original document from its upper left toward its lower right, and has a second color (e.g., blue) substantially in a longitudinally extending central portion. In S106, color number determining unit 501 determines that this block has three or more colors, and decides that the color number mode of this block is four-color mode with consideration given to the fact that the region dividing processing is to be performed three times. When the block to be processed is in the four-color mode, the processing is executed three times to perform the third region dividing processing (S110).

FIG. 12B shows a state after the first region dividing processing is performed on the block in FIG. 12A. By performing the first region dividing processing described above, the region having the second color is divided as the region 0, and the region having the first color is divided as the region 1.

Figure 13A:
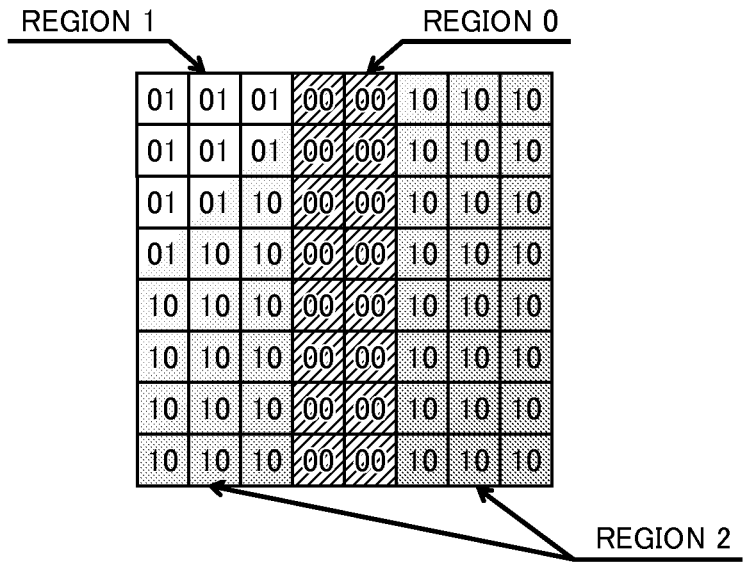

In S109, the second region dividing processing is likewise performed on the block that was subjected to the first region dividing processing and is in the state shown in FIG. 12B. More specifically, the color values represented by color numbers 00 and 01 are calculated as the average values of the colors in regions 0 and 1, respectively. Further, in the embodiment, one of region 0 or 1 in which variations in color value are larger than those in the other is divided by dividing unit 503 into regions of the color value larger than the average value and regions of the color value smaller than the average value, similarly to the first region dividing processing. FIG. 13A shows a state attained after the second region dividing processing was performed on the block in the state shown in FIG. 12B. The second region dividing processing described above further divides region 1 having the gradation of the first color into a region 1 having a gradation of a light color and a region 2 having a gradation of a dark color.

Figure 13B:
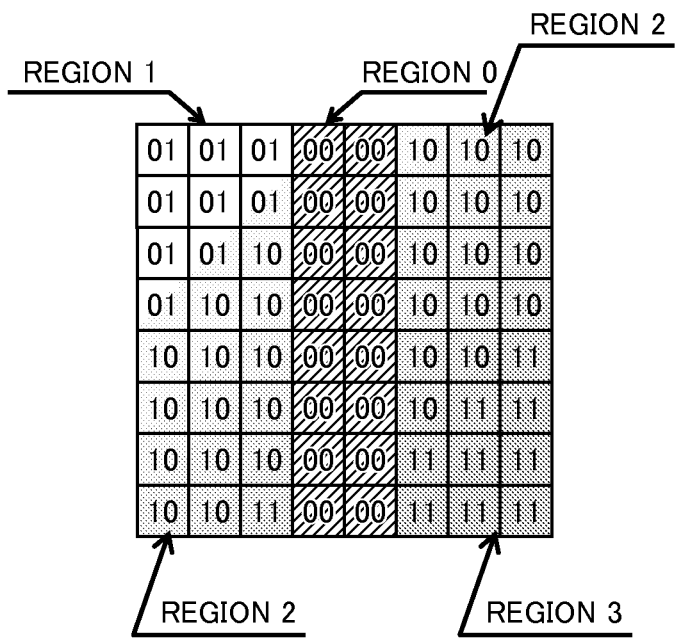

In S110, the third region dividing processing is likewise performed on the block that was subjected to the second region dividing processing and is in the state shown in FIG. 13A. More specifically, the color values represented by color numbers 00, 01 and 10 are calculated as the average values of the colors in regions 0, 1 and 2, respectively. Further, in the embodiment, regions 0, 1 or 2 in which variations in color value are larger than those in the others is divided by dividing unit 503 into regions of the color value larger than the average value and regions of the color value smaller than the average value, similarly to the first region dividing processing. FIG. 13B shows a state attained after the third region dividing processing was performed on the block in the state shown in FIG. 13A. The third region dividing processing described above further divides region 2 having the gradation of the dark color into a region 2 having a gradation of a light color and a region 3 having a gradation of a dark color.

In S111, representative value calculating unit 505 calculates the average values of the color values as the representative value of these regions. When the first color is red and the second color is blue, the representative color of each of regions 0, 1, 2, and 3 is specifically indicated in RGB values as expressed below and as shown in FIG. 14:

region 0: (R, G, B)=(15, 38, 240)
region 1: (R, G, B)=(252, 224, 234)
region 2: (R, G, B)=(247, 140, 191)
region 3: (R, G, B)=(232, 71, 127)

Figure 15A:
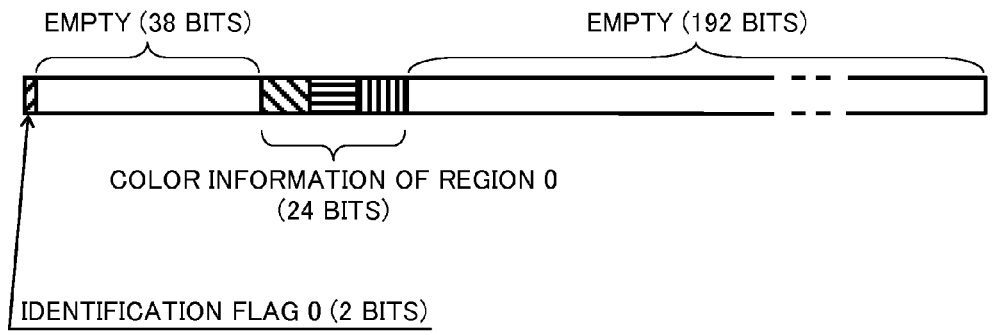
FIGS. 15A-15C show a specific example of the data structure of primary compression data of one block.
Figure 15B:
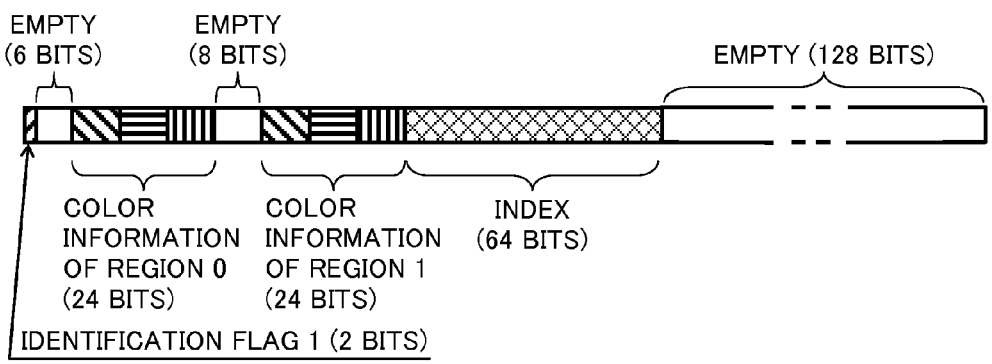
Figure 15C:
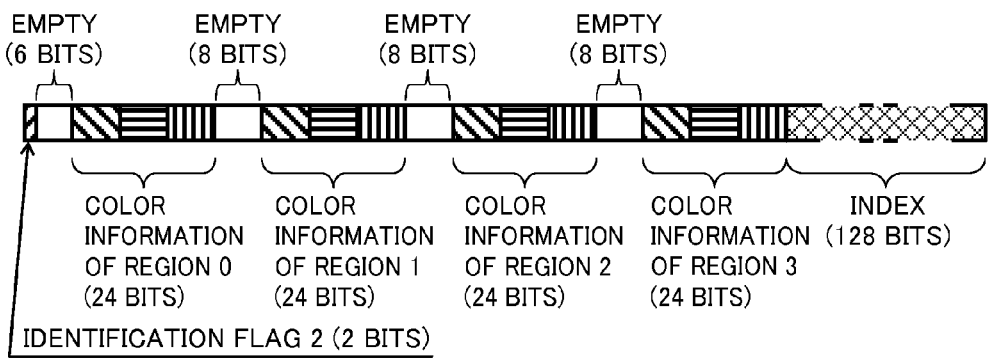

FIG. 15A-15C show a specific example of the data structure of primary compression data for one block that is output in S113. The primary compression data has a fixed length, e.g., of 256 bits. Among them, the first 2 bits represent an identification flag for identifying the color number mode. The bits following them include information representing the representative colors of respective regions 0-3 and, when necessary, further include an index that is information for indicating the regions to which the 64 picture elements forming the block belong, respectively. The color information is represented for each of the RGB channels by 8 bits, and the color information of one region is represented by 24 bits. The index for 64 picture elements of the block is represented by downwardly repeating rows or lines each describing information about 8 picture elements from the left to the right. In the two-color mode, each of the 64 picture elements is represented by one bit indicating either region 0 or region 1, and the index is represented by 64 bits. In the four-color mode, each of the 64 pixels is represented by 2 bits indicating one of regions 0-3, and the index is represented by 128 bits.

More specifically, FIGS. 15A, 15B and 15C show the structures of the primary compression data handled when the block is in the one-color mode, two-color mode and four-color mode, respectively. Referring to FIG. 15A, when the block is in the one-color mode, the region dividing processing is not performed so that only one region (region 0) is present. Therefore, the primary compression data includes only the identification flag and the color information about region 0, and the subsequent region does not record the data. Referring to FIG. 15B, in the two-color mode, the region dividing processing is performed one time so that the primary compression data includes the color information about each of the two regions 0 and 1 as well as the index in addition to the identification flag, and the subsequent region does not record the data. Referring to FIG. 15C, in the four-color mode, the region dividing processing is performed three times so that the primary compression data includes the color information about each of the four regions 0-3 as well as the index in addition to the identification flag, and the subsequent region does not record the data.

Figure 16:
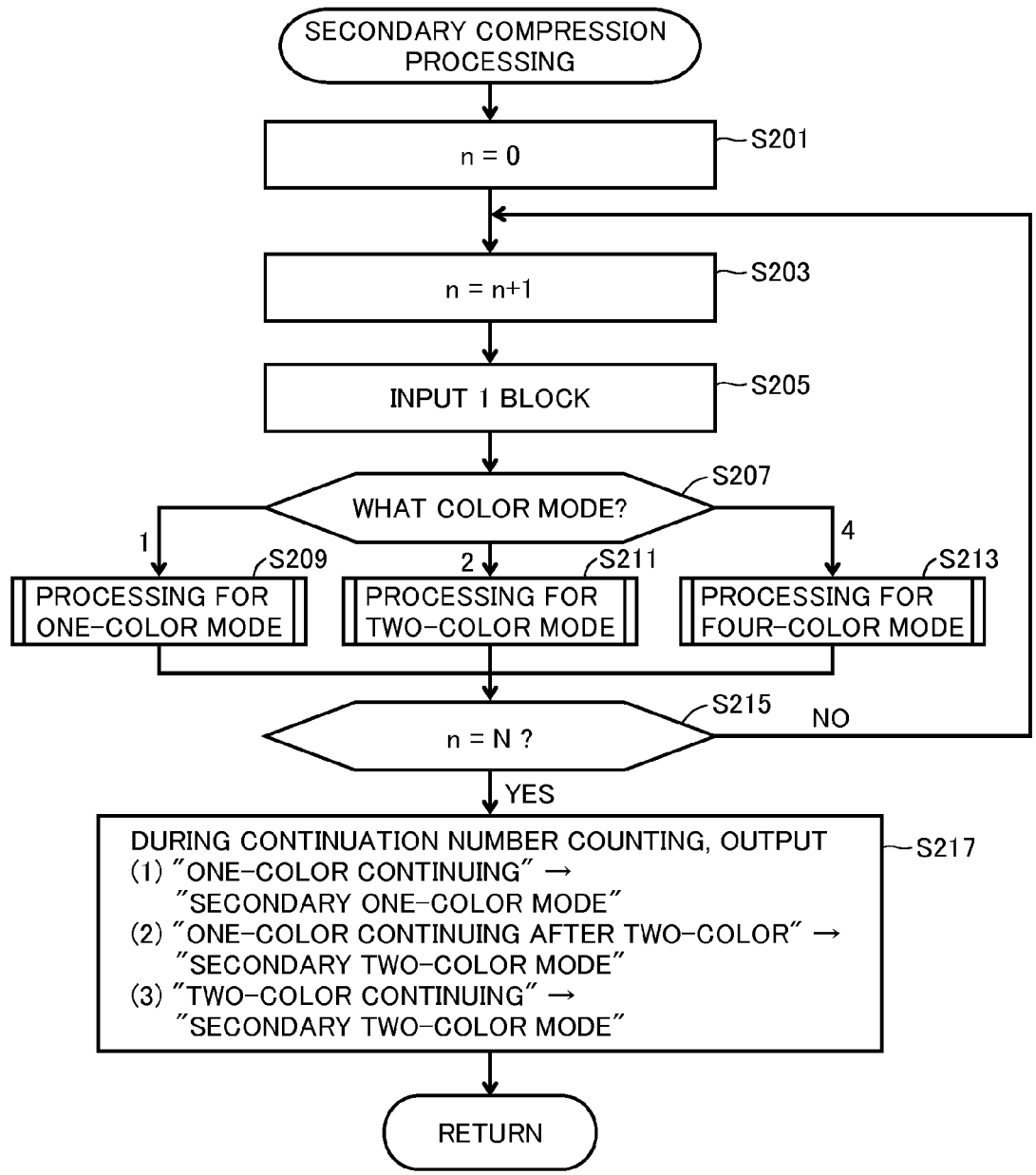
FIG. 16 is a flowchart showing a specific example of secondary compression processing.

Referring to FIG. 16, the secondary compression processing in the above S30 will be described below. The secondary compression is performed in view of the continuity of the primarily compressed block so that the blocks output in S113 are provided one by one from first compression unit 303 to second compression unit 305. Accordingly, after variable n is initialized in S201, variable n is incremented by one in S203. In S205, second compression unit 305 accepts, as the block corresponding to the variable of 2, the primary compression data for one block that is output from first compression unit 303 in S113. In S207, determining unit 705 determines the color number mode of the block that is input in S205, and the processing corresponding to the color number mode is performed in S209-S213 as will be described later. The processing described above is continued for each block until variable n reaches number N of the blocks divided in S101 (YES in S215).

Before describing the output in S217 and the processing for the color number modes in S209-S213, the processing status will be described. The processing status is information indicating a relationship between the last block and the current block in the processing that counts the continuous blocks related together in view of the color number mode of the block. More specifically, the processing state of the current block can be classified under four processing statuses of "one-color continuing", "two-color continuing", "one-color continuing after two-color" and "other than continuing". The "one-color continuing" indicates the state of the processing that counts the continuous blocks corresponding to the primary compression data determined as the one-color mode. The "two-color continuing" indicates the state of the processing that counts the continuous blocks corresponding to the primary compression data determined as the two-color mode. The "one-color continuing after two-color" relates to the processing performed after processing the blocks determined as the two-color mode in the primary compression data, and indicates the processing state of counting the continuous blocks determined as the one-color mode, i.e., the blocks formed only one of the two colors of the blocks. The "other than continuing" indicates the processing state in which counting is not performed. In the following example, there are four processing statuses. However, it is not essential that the processing statuses include the "one-color continuing after two-color". This is because the continuous blocks of the one-color mode following the blocks of the two-color mode may be counted in the processing status of the "one-color continuing" after the continuous blocks of the two-color mode may be counted in the processing status of the "two-color continuing". However, when this manner is employed, both kinds of data, i.e., the data resulting from the counting in the former processing status and the data resulting from the counting in the latter processing status are present after the secondary compression. Therefore, for further improving the efficiency of the secondary compression, consideration is given to the processing status of the "one-color continuing after two-color" that combine these two processing statuses into one processing status. A specific example will be described later in connection with a comparison between the case where consideration is given to the processing status of the "one-color continuing after two-color" and the case where the consideration is not given thereto.

When number N of the blocks divided in S101 is attained by the processing in the above S203-S213 (YES in S215) and the processing status is other than the "other than continuing", second compression unit 305 adds the continuity mode corresponding to the latest processing status stored in status storage unit 701 to the count of the continuous blocks in this latest processing status, and then ends the secondary compression processing. More specifically, secondary compression data producing unit 713 provides the information indicating the following continuity mode according to each processing status, as the secondary compression data, to the count result:

When the processing status is "one-color continuing": "secondary one-color mode"

When the processing status is "one-color continuing after two-color": "secondary two-color mode"

When the processing status is "two-color continuing": "secondary two-color mode"

Every time the first compression unit 303 provides the primarily compressed block, determining unit 705 determines which one of the above states corresponds to the state of the processing to be performed on the provided block, and thereby decides the processing status. After the start of the processing, one of the processing statuses other than the "other than continuing" is decided. Status storage unit 701 stores the determined processing status as the latest processing status.

Figure 17:
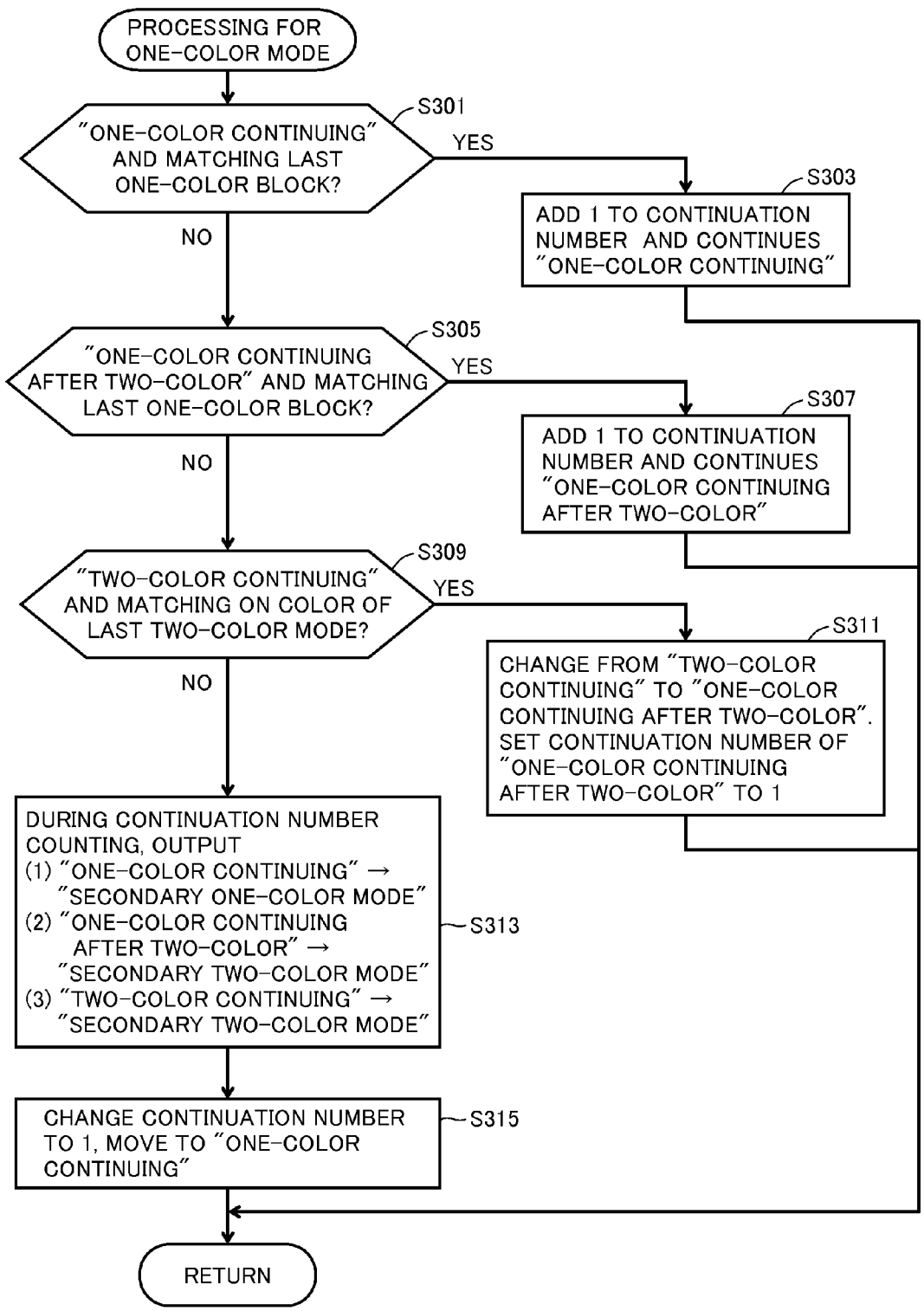
FIG. 17 is a flowchart showing a specific example of processing for a one-color mode.

Referring to FIG. 17, the processing for the one-color mode in S209 will be described below. Referring to FIG. 17, when it is determined that the primarily compressed block provided from first compression unit 303 is in the one-color mode, determining unit 705 determines the latest processing status stored in status storage unit 701. Further, it compares the color information of this block with the color information of the last block stored in last block information storage unit 707.

It is assumed that the latest processing status is "one-color continuing", and the color of the block in question matches the color of the last block in the one-color mode (YES in S301). In this case, counting unit 709 adds one to the count (i.e., the number of continuous blocks) of counter 711 corresponding to the processing status in question in S303. Status updating unit 703 does not change the latest processing status stored in status storage unit 701, and keeps the latest processing status as "one-color continuing".

It is assumed that the latest processing status is "one-color continuing after two-color", and the color of the block in question matches the color of the last block in the one-color mode (NO in S301 and YES in S305). In this case, counting unit 709 adds one to the count of the counter (particularly, counter corresponding to the processing status in question) in counter 711 in S307. Status updating unit 703 does not change the latest processing status stored in status storage unit 701, and keeps the latest processing status as the "one-color continuing after two-color".

It is assumed that the latest processing status is the "two-color continuing" and the color of the block in question matches one of the two colors of the last block that is in the two-color mode (NO in S301, NO in S305 and YES in S309). In this case, status updating unit 703 in S311 does not change the latest processing status stored in status storage unit 701, updates the latest processing status from the "two-color continuing" to the "one-color continuing after two-color and thus changes the latest processing status. Counting unit 709 adds one to the continuous block number in the counter corresponding to the "one-color continuing after two-color" in counter 711.

When none of the above cases is true (NO in S301, S305 and S309) and the processing is in the status other than the "other than continuing", second compression unit 305 adds, in S313, the continuity mode corresponding to this processing status to the count of the continuous blocks in the latest processing status stored in status storage unit 701, and outputs it. More specifically, secondary compression data producing unit 713 adds, as the secondary compression data, the information selectively indicating the following continuity modes corresponding to the respective processing statuses to the count result, and outputs it in a format shown in FIG. 20.

When the processing status is "one-color continuing": "secondary one-color mode"

When the processing status is "one-color continuing after two-color": "secondary two-color mode"

When the processing status is "two-color continuing": "secondary two-color mode"

When the processing status is other than the "other than continuing", S313 is skipped, and the above output is not performed. A specific example will be described later in connection with the specific data structure of the secondary compression data provided in S313.

Then, determining unit 705 sets the latest processing status to the "one-color continuing" in S315, and adds one to the continuous block number in the counter corresponding to this processing status in counter 711.

Figure 18:
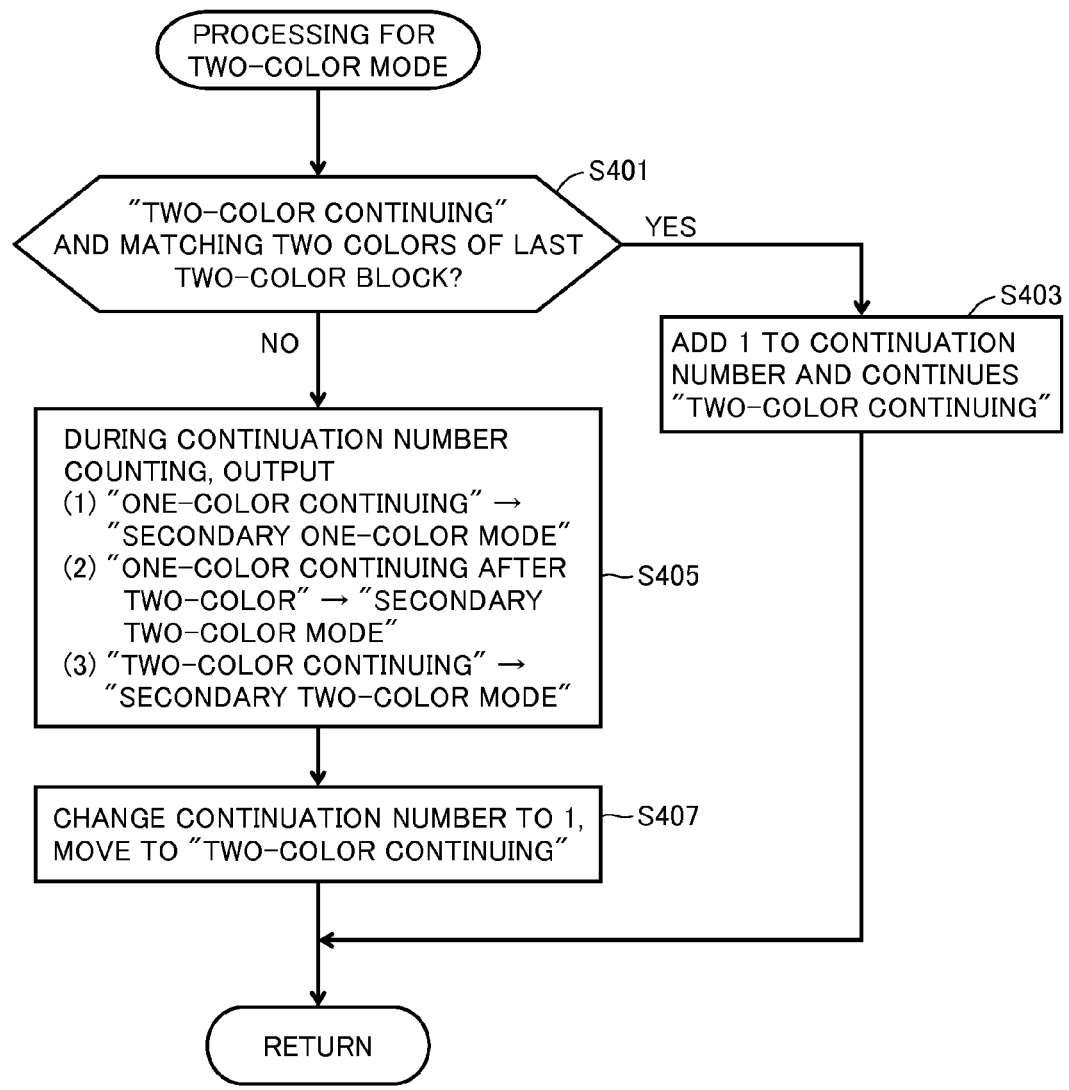
FIG. 18 is a flowchart showing a specific example of processing for a two-color mode.

Referring to FIG. 18, the processing for the two-color mode in S211 will be described below. Referring to FIG. 18, when it is determined that the primarily compressed block provided from first compression unit 303 is the two-color mode, determining unit 705 determines the latest processing status stored in status storage unit 701. Further, it compares the color information of this block with the color information of the last block stored in last block information storage unit 707.

It is assumed that the latest processing status is "two-color continuing", and the two colors of the block in question match the colors of the last block in the two-color mode (YES in S401). In this case, counting unit 709 adds one to the count (i.e., the number of continuous blocks) of counter 711 corresponding to the processing status in question in S403. Status updating unit 703 does not change the latest processing status stored in status storage unit 701, and keeps the latest processing status as "two-color continuing".

When a difference occurs in one or both the colors, or the latest processing status is other than the "two-color continuing" (NO in S401), second compression unit 305 operates, in response to the processing status other than the "other than continuing", to add the mode corresponding to the processing status in question to the count of the continuous blocks in the latest processing status stored in status storage unit 701 and outputs it in S405. A correlation between the processing statuses and the modes is the same as that illustrated in connection with S313. When the processing status is other than the "other than continuing", S313 is skipped, and the above output is not performed.

In S407, determining unit 705 then determines the latest processing status as the "two-color continuing", and counting unit 709 adds one to the count of the corresponding counter (i.e., the counter corresponding to the processing status in question) in counter 711.

Referring to FIG. 19, the processing for the four-color mode in S213 will be described below. As shown in FIG. 19, when it is determined that the primarily compressed block provided from first compression unit 303 is in the four-color mode, second compression unit 305 does not count the continuous blocks in this mode. This is based on the consideration that, in an actual original image, the blocks having the same four colors are hardly continuous in the region requiring the reproduction in four colors. Accordingly, when it is determined that the primarily compressed block provided from first compression unit 303 is in the four-color mode and the processing status is other than the "other than continuing" in S501 shown in FIG. 19, second compression unit 305 adds the continuity mode corresponding to the processing status in question to the count of the continuous blocks in the latest processing status stored in status storage unit 701, and outputs it. A correlation between the processing statuses and the modes is the same as that illustrated in connection with S313. When the processing status is other than the "other than continuing", S501 is skipped, and the above output is not performed.

Thereafter, in S503, second compression unit 305 adds the information indicating the "secondary four-color mode" to the input block in the four-color mode, and outputs it as it is.

Figure 20A:
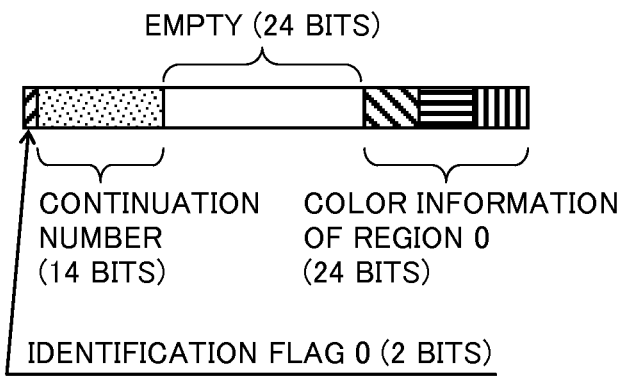
FIGS. 20A and 20B show a specific example of the data structure of the secondary compression data.
Figure 20B:
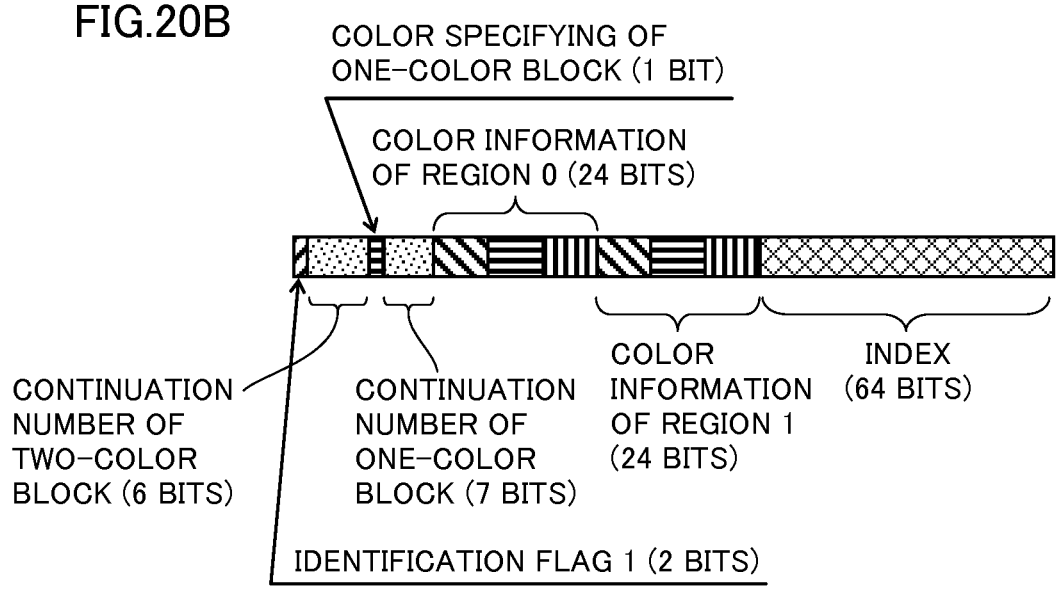

FIGS. 20A and 20B show a specific example of the data structure of the secondary compression data that is output in S313, S405 and S501. FIG. 20A shows a data structure of the secondary compression data determined as the "secondary one-color mode", and FIG. 20B shows a specific example of the data structure of the secondary compression data determined as the "secondary two-color mode".

Referring to FIG. 20A, the secondary compression data determined as the "secondary on-color mode" differs from the primary compression data obtained when the block shown in FIG. 15A is in the one-color mode in that the identification flag represented by the first 2 bits and indicating the color number mode of this primary compression data are replaced with the identification flag indicating the continuity mode of the secondary compression data. Subsequent 14 bits in 38 bits that form an empty region of the secondary compression data represent the information indicating the number of the continuous blocks (i.e., the primary compression data) that are counted in the "one-color continuing" i.e., the processing status corresponding to this continuity mode. The color information represented by the 8 bits included in this primary compression data is left in the secondary compression data as it its. The secondary compression data does not include 192 bits that form an empty region following the color information in the primary compression data.

Referring to FIG. 20B, the secondary compression data determined as the "secondary two-color mode" is different from the primary compression data obtained when the block shown in FIG. 15B is in the two-color mode in that the identification flag represented by the first 2 bits and indicating the color number mode of the primary compression data is replaced with the identification flag indicating the continuity mode of the secondary compression data. Six bits that formed an empty region in the primary compression data represent the information that indicates the number of continuous blocks of the primary compression data, and particularly the number of continuous blocks counted in the processing status of the "two-color continuing", i.e., one of the processing statuses "one-color continuing after two-color" and "two-color continuing" corresponding to the continuity mode in question. Subsequently, information represented by 1 bit and the information represented by 7 bits are added to the primary compression data. The above information represented by the one bit indicates one of the two color information items about two colors. This indicated one information item indicates the color of the primarily compressed blocks that are in the one-color mode and are counted in the processing status of the "one-color continuing after two-color" selected from between the above two processing statuses corresponds to the continuity mode in question. The above information item represented by the 7 bits indicates the number of primarily compressed continuous blocks in the one-color mode that are counted in the processing status of the "one-color continuing after two-color". The color information items each represented by 8 bits included in this primary compression data as well as the index represented by 64 bits are left in the secondary compression data as they are. The secondary compression data does not include the 128 bits included in the first compression data and forming the empty region following the index.

The data structure of the secondarily compressed block in the four-color mode is substantially the same as the primary compression data shown in FIG. 15C. However, the identification flag represented by the first 2 bits and indicating the color number mode of the primary compression data is replaced with the identification flag indicating the continuity mode of the secondary compression data.

Referring to FIGS. 21-27, a specific example of the secondary compression processing will be described below.

Figure 22A:
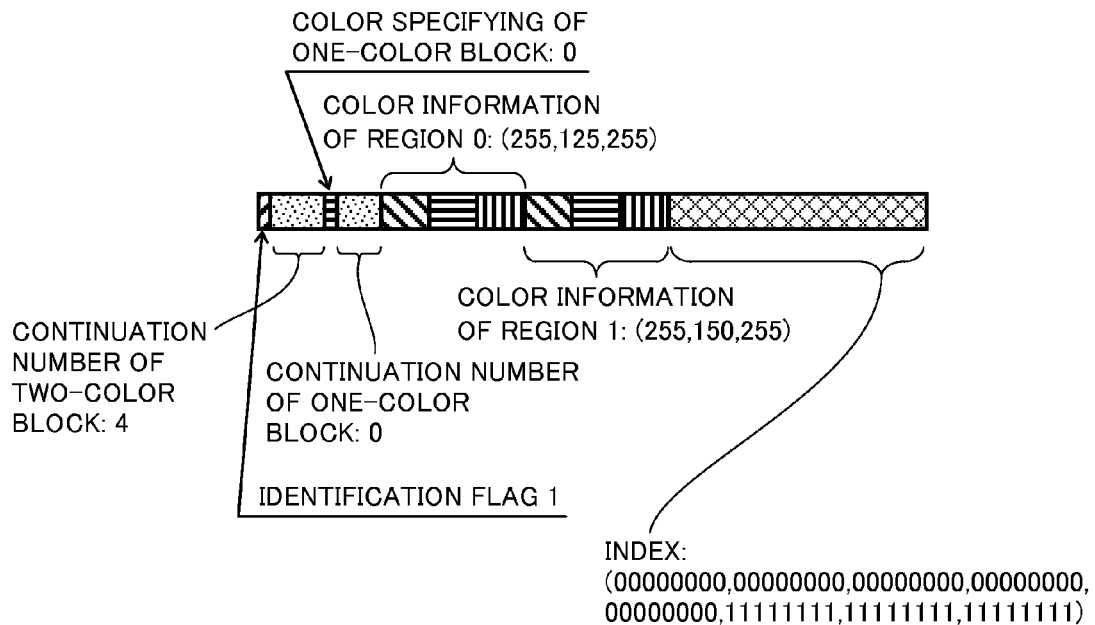
FIGS. 22A and 22B show a specific example of the secondary compression data.
Figure 22B:
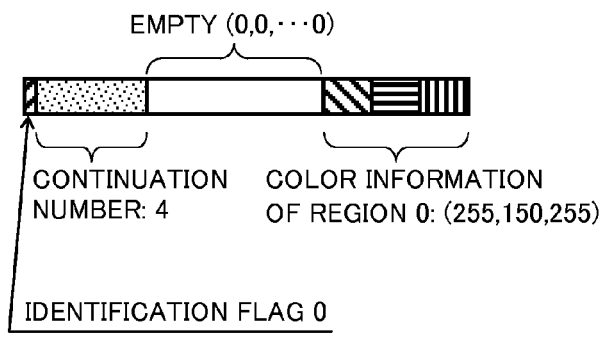

FIG. 21 illustrates the secondary compression processing continuously performed on the primarily compressed blocks, which are obtained by primarily compressing the original image, and this original image has a longitudinal gradation varying in a longitudinal direction perpendicular to the compression direction. In the example shown in FIG. 21, the first row includes 4 blocks which are continuous in the lateral (row) direction and each have first and second colors aligned in the longitudinal direction. First compression unit 303 determines these blocks as the two-color mode, and adds the identification flag indicating the two-color mode to the primary compression data. Therefore, when these blocks are provided to second compression unit 305, it executes the processing for the two-color mode (S211), and the four continuous blocks are counted in the processing status of the "two-color continuing". Therefore, when the secondary compression of the first row is completed, the primary compression data for these four blocks changes into the secondary compression data in which the identification flag indicating the mode of the primary compression data is replaced with the identification flag indicating the "secondary two-color mode", the empty bits are deleted, the continuation number is 4 and the data is encoded into one code corresponding to the primary compression data for the one block. FIG. 22A shows a specific example of the secondary compression data of the first row. Likewise, when the blocks in the second row are successively input from first compression unit 303 to second compression unit 305, second compression unit 305 executes the processing (S209) for the one-color mode, and the four continuous blocks are counted in the processing status of the "one-color continuing". Therefore, when the secondary compression of the second row is completed, as shown in FIG. 21, the primary compression data for the four blocks changes into the secondary compression data in which the identification flag indicating the mode of the primary compression data is replaced with the identification flag indicating the "secondary one-color mode", the empty bits are deleted, the continuation number is four and the data is encoded into one code corresponding to the primary compression data for the one block. FIG. 22B shows a specific example of this secondary compression data of the second row.

Since PC 1 performs the foregoing secondary compression processing described above, the longitudinal gradation image shown in FIG. 21, i.e., the original image having the gradation in the direction perpendicular to the compression direction is merely processed to count the continuous blocks, and thereby the encoding into one code is performed as shown on the right side in FIG. 21A and FIGS. 22A and 22B so that the data quantity can be remarkably suppressed.

Figure 23:
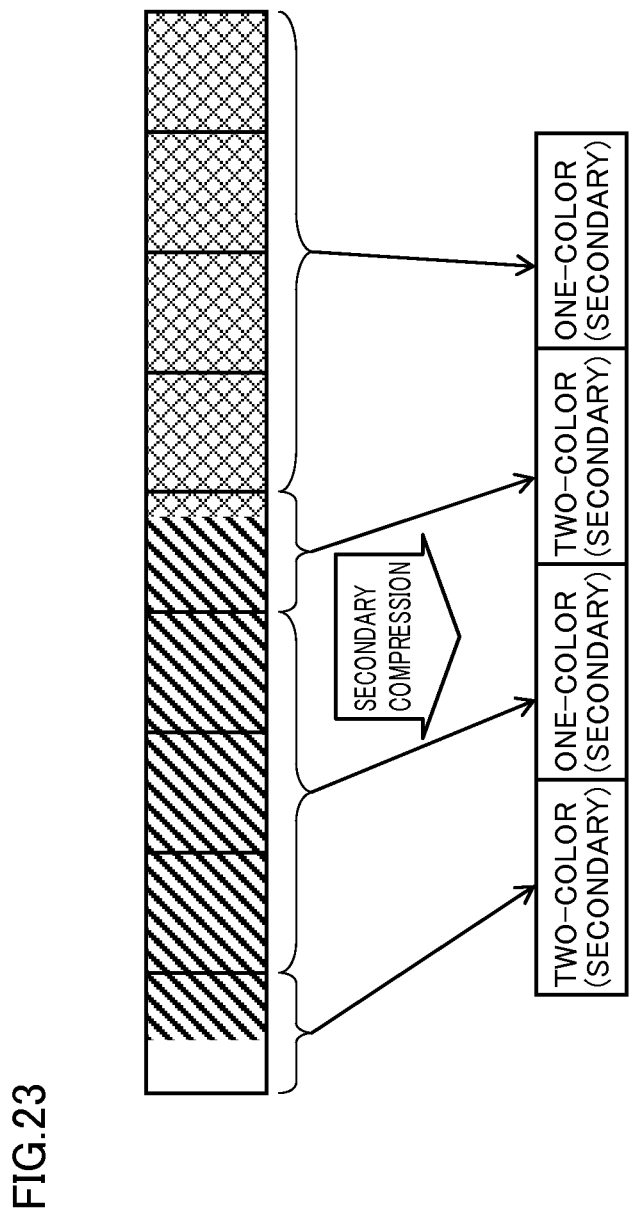
FIG. 23 illustrates secondary compression processing of an original image having a lateral gradation.

FIG. 23 illustrates the secondary compression processing continuously performed on the primarily compressed blocks, and particularly illustrates a first example of the secondary compression processing of the blocks obtained by primarily compressing the original image that has a lateral gradation continuously changing in a lateral direction, i.e., a direction matching the compression direction. In the first example of the secondary compression processing, it is assumed that the secondary compression processing is performed without considering the processing status of the "one-color continuing after two-color". In the example shown in FIG. 23, a first block on the left end has a first color at a downstream portion, second to fourth blocks entirely have only the first color, a fifth block has first and second colors aligned laterally in this order, and sixth to ninth blocks entirely have only the second color.

When the blocks shown in FIG. 23 are successively input to second compression unit 305, the processing is performed as follows. From each of the first and fifth blocks, continuation number of 1 is obtained in the processing status of the "two-color continuing". From the second to fourth blocks, the continuation number 3 is obtained in the processing status of the "one-color continuing". From the sixth to ninth blocks, the continuation number 4 is obtained in the processing status of the "one-color continuing".

Figure 24A:
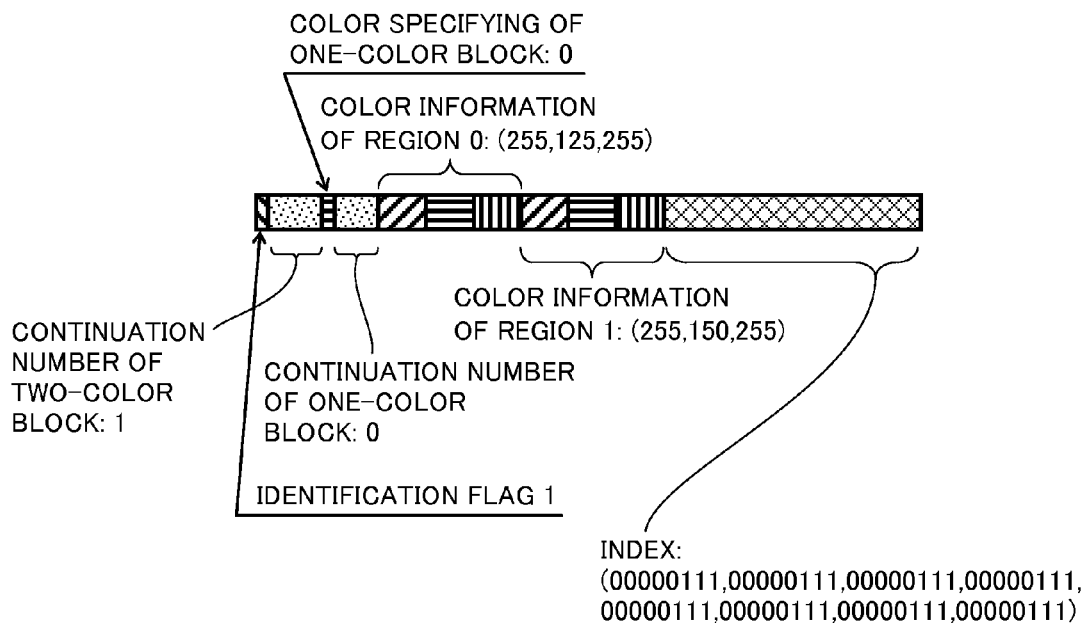
FIGS. 24A, 24B, 25A and 25B show specific examples of the secondary compression data.

More specifically, when the second block is input to second compression unit 305, the secondary compression data of the first block is output. The secondary compression data of the first block is encoded into one code corresponding to such a primary compression data for one block that the identification flag indicating the color number mode of the primary compression data is replaced with the identification flag indicating the "secondary two-color mode", empty bits are deleted, the continuation number of the two-color block is 1, and the color destination of the one-color block and the continuation number are both determined as 0. FIG. 24A shows a specific example of the secondary compression data of the first block.

Figure 24B:
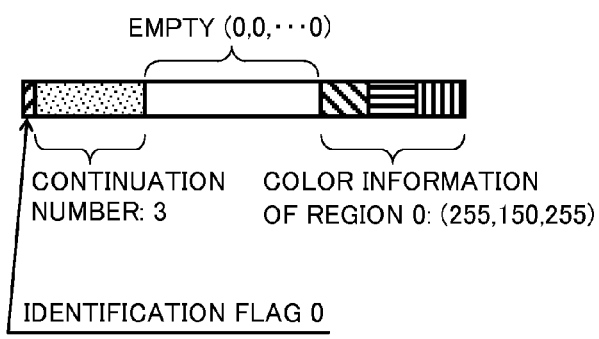

When the fifth block is input to second compression unit 305, the secondary compression data of the second to fourth blocks is output. The secondary compression data of the second to fourth blocks is encoded into one code corresponding to such a primary compression data for one block that the identification flag indicating the color number mode of the primary compression data is replaced with the identification flag indicating the "secondary one-color mode", empty bits are deleted, and the continuation number is determined as 3. FIG. 24B shows a specific example of the secondary compression data of the second to fourth blocks.

Figure 25A:
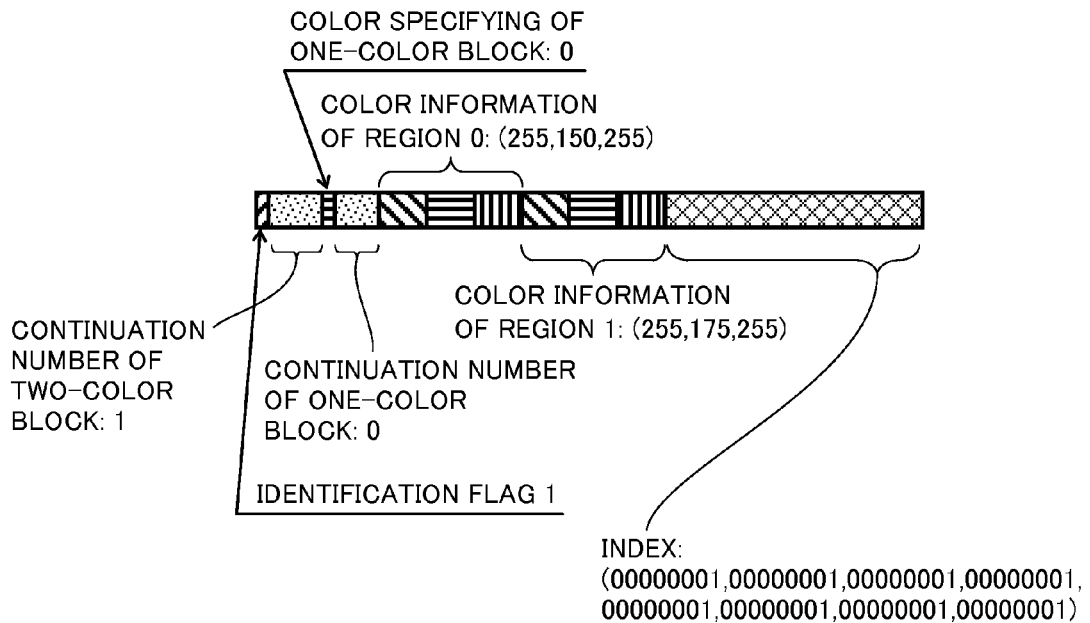

When the sixth block is input to second compression unit 305, the secondary compression data of the fifth block is output. The secondary compression data of the fifth block is encoded into one code corresponding to such a primary compression data for one block that the identification flag indicating the color number mode of the primary compression data is replaced with the identification flag indicating the "secondary two-color mode", empty bits are deleted, the continuation number of the two-color block is 1, and the color destination and continuation number of the one-color block are both determined as 0. FIG. 25A shows a specific example of the secondary compression data of the sixth block.

Figure 25B:
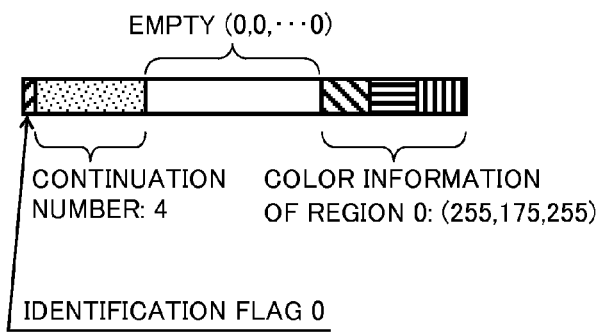

Then, the secondary compression data of the sixth to ninth blocks is output in response to, e.g., the fact that the tenth block (not shown) is input to second compression unit 305, or the fact that the ninth block is determined as the final block in the row in question. The secondary compression data of the sixth to ninth blocks is encoded into one code corresponding to such a primary compression data for one block that the identification flag indicating the color number mode of the primary compression data is replaced with the identification flag indicating the "secondary two-color mode", empty bits are deleted, and the continuation number is 4. FIG. 25B shows a specific example of the secondary compression data of the sixth to ninth blocks.

Since PC 1 performs the secondary compression processing described as the foregoing first example, the image having the lateral gradation shown in FIG. 22, i.e., the original image having the gradation in the direction matching the compression direction is subjected to the processing in which the counts each representing the number of continuous blocks formed of one color are obtained, and the encoding to the one code is performed as shown in FIGS. 23, 24A, 24B, 25A and 25B. Therefore, the data quantity can be suppressed. However, when the image has the lateral gradation, the laterally continuous blocks of the same one color are not large in number. Therefore, the compression efficiency of the secondary compression is less improved than the longitudinal gradation illustrated in FIGS. 21, 22A and 22B. Particularly, when the gradation is strong, i.e., when one color in the gradation is narrow in width, blocks each formed of two colors and blocks each formed of one color are present finely and alternately to each other so that the secondary compression is performed less effectively as the continuation number decreases. For improving the secondary compression efficiency in this case, it is preferable to give consideration to the processing status of the "one-color continuing after two-color" in the secondary compression.

Figure 26:
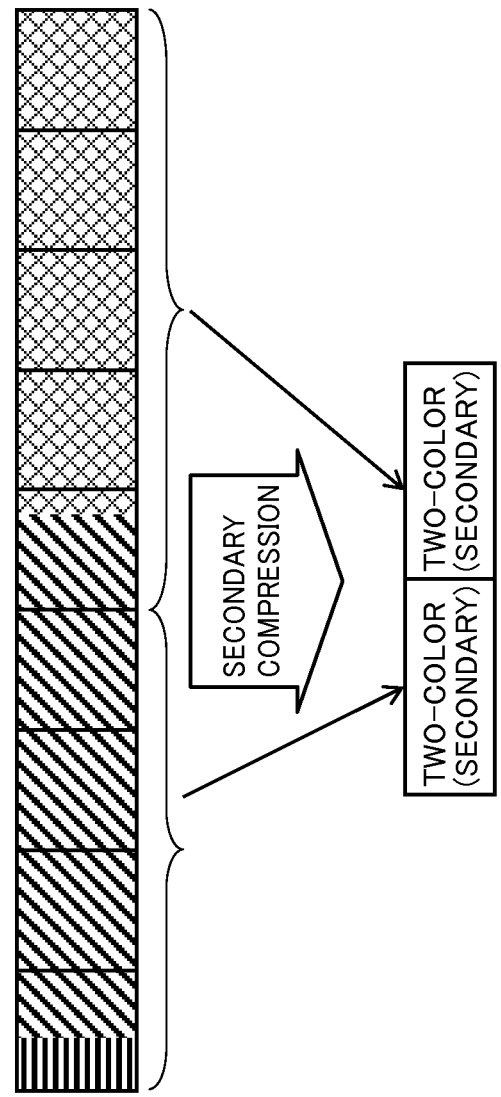
FIG. 26 illustrates the secondary compression processing of the original image having the lateral gradation.

FIG. 26 illustrates the secondary compression processing on the continuous blocks subjected to the primary compression, and particularly illustrates a second example of the secondary compression processing of the blocks obtained by primarily compressing the original image having a lateral gradation that continuously changes in the lateral direction, i.e., in the direction matching the compression direction. In the second example of the secondary compression, when the secondary compression is performed in view of the processing status of the "one-color after two-color". In the example shown in FIG. 26, the first block on at the left end has the first and second colors aligned laterally in this order, the second to fourth blocks have only the second color, the fifth block has the second and third colors aligned laterally in this order, and the sixth to ninth blocks have only a third color.

When the blocks shown in FIG. 26 are successively input to second compression unit 305, the processing is performed as follows. From each of the first and fifth blocks, continuation number of 1 is obtained in the processing status of the "two-color continuing". From the second to fourth blocks, the continuation number 3 is obtained in the processing status of the "one-color continuing after two-color". From the sixth to ninth blocks, the continuation number 4 is obtained in the processing status of the "one-color continuing after two-color". As described before, when the processing status changes from the processing status of the "two-color continuing" to the processing status of the "one-color continuing after two-color", the secondary compression data is not output based on the count result in the processing status of the "two-color continuing" during this change, and the secondary compression data is output based on the count result in the "two-color continuing" and the count result in the "one-color continuing after two-color". The information indicating the "secondary two-color mode" is added to the count result in each processing status.

Figure 27A:
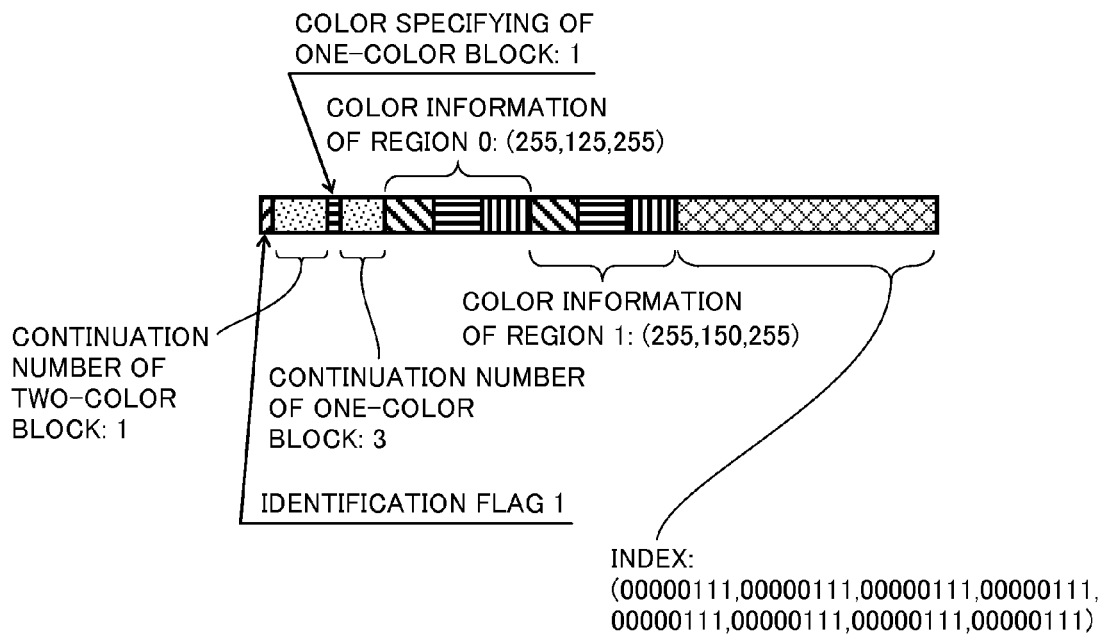
FIGS. 27A and 27B show a specific example of the secondary compression data.

More specifically, when the fifth block is input to second compression unit 305, the secondary compression data of the first to fourth blocks is output. The secondary compression data of the first to fourth blocks is encoded into one code corresponding to such a primary compression data for one block that the identification flag indicating the color number mode of the primary compression data is replaced with the identification flag indicating the "secondary two-color mode", empty bits are deleted, the continuation number of the two-color block is 1, and the continuation number of the one-color blocks is 3. FIG. 27A shows a specific example of the secondary compression data of the first to fourth blocks.

Figure 27B:
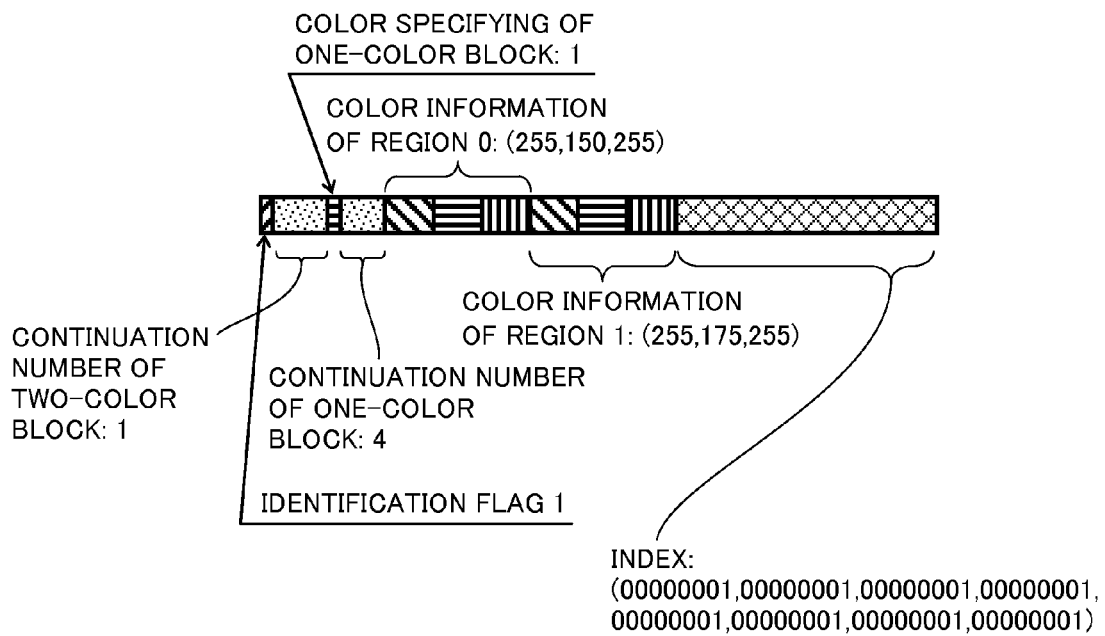

Then, the secondary compression data of the fifth to ninth blocks is output in response to, e.g., the fact that the tenth block (not shown) is input to second compression unit 305, or the fact that the ninth block is determined as the final block in the row in question. The secondary compression data of the fifth to ninth blocks is encoded into one code corresponding to such a primary compression data for one block that the identification flag indicating the color number mode of the primary compression data is replaced with the identification flag indicating the "secondary two-color mode", empty bits are deleted, the continuation number of the two-color block is 1, and the continuation number of the one-color blocks is 4. FIG. 27B shows a specific example of the secondary compression data of the fifth to ninth blocks.

Since PC 1 performs the secondary compression processing in view of the processing status of the "one-color continuing after two-color" described above, the image having the lateral gradation shown in FIG. 26, i.e., the original image having the gradation in the direction matching the compression direction is processed such that the block in the two-color mode and the blocks in the one-color mode continuing to the above two-color mode block are collectively subjected to the secondary compression. In the lateral gradation, the one color of the block formed of the one color is the same as one of the two colors of the block formed of the two colors in many cases. Accordingly, in the secondary compression processing performed in view of the processing status of the "one-color continuing after two-color", the encoding is performed to provide one code represented by the information and the continuation number, i.e., the information indicating which one of the two colors of the block in the two-color mode matches the block in the one-color mode following the block in the two-color mode, as well as the continuation number of the blocks in the above one-color mode. Thereby, the efficiency of the secondary compression of the lateral gradation can be significantly improved, as compared with the secondary compression performed without giving consideration to the processing status of the "one-color continuing after two-color" that is already illustrated in FIGS. 23, 24A, 24B, 25A and 25B. In particular, when second compression unit 305 is implemented by a hardware structure, it is necessary in some cases to define the size of the output data by a multiple of 32 bits or 64 bits for the purpose of improving efficiency of transfer of data having a fixed size, or due to restriction by a traffic of a data bus. In these cases, the PC 1 can output the secondary compression data, using the empty bit area that occurs in the output data.

In the foregoing examples, PC 1 shown in FIG. 1 performs the compression processing on the original image data. However, MFP 2 shown in FIG. 2 may likewise perform the compression processing. Also, PC1 or MFP2 may perform communications with another device that includes at least a part of the functions (e.g., a patter storage unit) of PC1 or MFP 2, and thereby may execute the foregoing processing. Further, it is possible to provide a program for causing the computer to execute the above processing. The above program may be recorded on a computer-readable recording medium such as a CD-ROM (Compact Disk-Read Only Memory), ROM (Read Only Memory), RAM (Random Access Memory) and memory card for providing it as a program product. Also, the program may be recorded on a recording medium such as a hard disk in a computer for providing the program. The program may be provided by downloading over a network.

The above program may be configured such that the processing is executed by calling required program modules, in a predetermined order according to predetermined timing, from a group of program modules provided as a part of an Operating System (OS) of the computer. In this case, the program itself does not include the above module, and the processing is executed by cooperation with the OS. The above program not including the above module is also included in the programs that are already described.

The above program may be incorporated into another (i.e., different) program for providing it. In this case, the program itself does not include a module included in the above different program, and the processing is executed in cooperation with the above different program. The program incorporated into the different program may be included in the foregoing program.

The provided program product is installed in a program storage unit such as a hard disk. The program product includes the program itself and the medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing method for encoding image data, comprising:
   dividing said image data into a plurality of blocks of a predetermined size, wherein the predetermined size comprises a plurality of pixels; and
   compressing said image data into a smaller number of codes than a number of said plurality of divided blocks by encoding both of a first block and a second block included among said plurality of divided blocks into one code, said first block having two colors, and said second block being arranged adjacent to said first block in an encoding direction and having only one of said two colors of said first block;
   wherein said one code representing said first block and second block includes first information specifying each of said two colors of said first block and second information of one bit specifying only one of said two colors for specifying the color of said second block.

2. The image processing method according to claim 1, wherein said code includes information indicating a number of continuous second blocks.

3. The image processing method according to claim 1, wherein
   said step of compressing further comprises:
   primarily compressing each of said plurality of blocks for representation into a number of representative color(s);
   determining the number of the representative color(s) of said primarily compressed blocks; and
   specifying said first block and second block according to determination of the number of said representative color(s), and performing secondary compression by performing the encoding into said one code.

4. An image processing apparatus comprising:
   an input device for accepting input of image data; and
   a controller for controlling and causing said image processing apparatus to perform the following processing on said image data:
   (i) dividing said image data into a plurality of blocks of a predetermined size, wherein the predetermined size comprises a plurality of pixels; and
   (ii) compressing said image data into a smaller number of codes than a number of said plurality of divided blocks by encoding both of a first block and a second block included among said plurality of divided blocks into one code, said first block having two colors, and said second block being arranged adjacent to said first block in an encoding direction and having only one of said two colors of said first block;
   wherein said one code representing said first block and second block includes first information specifying each of said two colors of said first block and second information of one bit specifying only one of said two colors for specifying the color of said second block.

5. The image processing apparatus according to claim 4, wherein said code includes information indicating a number of continuous second blocks.

6. The image processing apparatus according to claim 4, wherein
   said controller controls and causes said image processing apparatus to perform, in said encoding processing, the processing of;
   (i) primarily compressing each of said plurality of blocks for representation in a number of representative color(s);
   (ii) determining the number of the representative color(s) of said primarily compressed blocks; and
   (iii) specifying said first block and second block according to determination of the number of said representative color(s), and performing secondary compression by performing the encoding into said one code.

7. A computer-readable non-transitory medium storing a program for causing a computer to execute processing of encoding image data, wherein said processing includes the steps of:
   dividing said image data into a plurality of blocks of a predetermined size wherein the predetermined size comprises a plurality of pixels; and
   compressing said image data into a smaller number of codes than a number of said plurality of divided blocks by encoding both of a first block and a second block included among said plurality of divided blocks into one code, said first block having two colors, and said second block being arranged adjacent to said first block in an encoding direction and having only one of said two colors of said first block;
   wherein said one code representing said first block and second block includes first information specifying each of said two colors of said first block and second information of one bit specifying only one of said two colors for specifying the color of said second block.

* * * * *